US010628057B2

(12) United States Patent
Richardson et al.

(10) Patent No.: US 10,628,057 B2
(45) Date of Patent: Apr. 21, 2020

(54) CAPABILITY BASED LOCKING AND ACCESS OF SHARED PERSISTENT MEMORY

(71) Applicant: HEWLETT PACKARD ENTERPRISE DEVELOPMENT LP, Houston, TX (US)

(72) Inventors: Alexander Leslie Richardson, Palo Alto, CA (US); Moritz Josef Hoffmann, Palo Alto, CA (US); Dejan S. Milojicic, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/471,166

(22) Filed: Mar. 28, 2017

(65) Prior Publication Data
US 2018/0285003 A1 Oct. 4, 2018

(51) Int. Cl.
*G06F 3/06* (2006.01)
*G06F 9/52* (2006.01)

(52) U.S. Cl.
CPC .......... *G06F 3/0622* (2013.01); *G06F 3/0634* (2013.01); *G06F 3/0659* (2013.01); *G06F 3/0683* (2013.01); *G06F 9/526* (2013.01)

(58) Field of Classification Search
CPC ...... G06F 3/0622; G06F 9/526; G06F 3/0683; G06F 3/0634; G06F 3/0659
See application file for complete search history.

(56) References Cited

U.S. PATENT DOCUMENTS

| 4,979,099 A | * | 12/1990 | Milia | .............. G06F 13/378 |
| | | | | 710/125 |
| 6,651,088 B1 | | 11/2003 | Zhang et al. | |

(Continued)

OTHER PUBLICATIONS

Jonathan Woodruff et al., "The CHERI Capability Model: Revisiting RISC in an Age of Risk," 2014 ACM/IEEE 41st ISCA, Jun. 2014, pp. 1-12, IEEE.

(Continued)

*Primary Examiner* — Francisco A Grullon
(74) *Attorney, Agent, or Firm* — Hewlett Packard Enterprise Patent Department

(57) ABSTRACT

An example computing system may include a plurality of processors, persistent memory that is shared by the plurality of processors, and a memory-side accelerator that is to control access to the memory. A requesting processor of the plurality of processors may simultaneously request locking of and access to a target data object of the persistent memory by sending a single lock-and-access message to the memory-side accelerator. The lock-and-access message may include a first memory capability pointing to the target data object, a second memory capability pointing to a lock object that controls locking of the target data object, and a specified access operation that is requested. The memory-side accelerator may, in response to receiving the lock-and-access message: fetch locking information that is stored in the lock object pointed to by the second memory capability, and determine, based on the locking information, whether to lock and perform the requested access operation on the target data object pointed to by the first memory capability for the requesting processor.

20 Claims, 14 Drawing Sheets

(56) References Cited

U.S. PATENT DOCUMENTS

| | | | | |
|---|---|---|---|---|
| 6,816,952 | B1* | 11/2004 | Vartti | G06F 9/52 |
| | | | | 711/163 |
| 7,620,954 | B2* | 11/2009 | Mattina | G06F 12/0824 |
| | | | | 711/130 |
| 8,793,471 | B2 | 7/2014 | Serebrin et al. | |
| 9,372,752 | B2 | 6/2016 | Das Sharma et al. | |
| 2002/0161889 | A1* | 10/2002 | Gamache | G06F 11/1482 |
| | | | | 709/226 |
| 2003/0041225 | A1* | 2/2003 | Mattina | G06F 12/0824 |
| | | | | 712/30 |
| 2004/0255084 | A1* | 12/2004 | Day | G06F 9/526 |
| | | | | 711/145 |
| 2006/0242644 | A1* | 10/2006 | Blue | G06F 9/526 |
| | | | | 718/100 |
| 2007/0079037 | A1 | 4/2007 | Scoredos | |
| 2008/0162823 | A1* | 7/2008 | Day | G06F 9/30087 |
| | | | | 711/138 |
| 2008/0256074 | A1* | 10/2008 | Lev | G06F 9/466 |
| 2009/0198695 | A1 | 8/2009 | Arimilli et al. | |
| 2009/0328041 | A1 | 12/2009 | Sudzilouski | |
| 2010/0275216 | A1* | 10/2010 | Crowell | G06F 9/526 |
| | | | | 718/106 |
| 2013/0185270 | A1* | 7/2013 | Brower | G06F 17/30362 |
| | | | | 707/704 |
| 2015/0339259 | A1* | 11/2015 | Ekberg | G06F 3/0622 |
| | | | | 709/213 |

OTHER PUBLICATIONS

Mainak Chaudhuri and Mark Heinrich, "SMTp: An Architecture for Next-generation Scalable Multi-threading," 31st Annual ISCA, 2004, pp. 1-12, IEEE, Available at: <cse.iitk.ac.in/users/mainakc/pub/SMTp.pdf>.

Extended European Search Report, EP Application No. 18164166.3, dated Aug. 3, 2018, pp. 1-9, EPO.

Kristin Thomas, "Programming Locking Applications", Aug. 2001, pp. 1-132, IBM Corporation.

Kwon, A. et al., "Low-Fat Pointers: Compact Encoding and Efficient Gate-Level Implementation of Fat Pointers for Spatial Safety and Capability-based Security," ACM, Nov. 4, 2013, pp. 721-732, http://citeseerx.ist.psu.edu/viewdoc/download?doi=10.1.1.497.3781&rep=rep1&type=pdf.

* cited by examiner

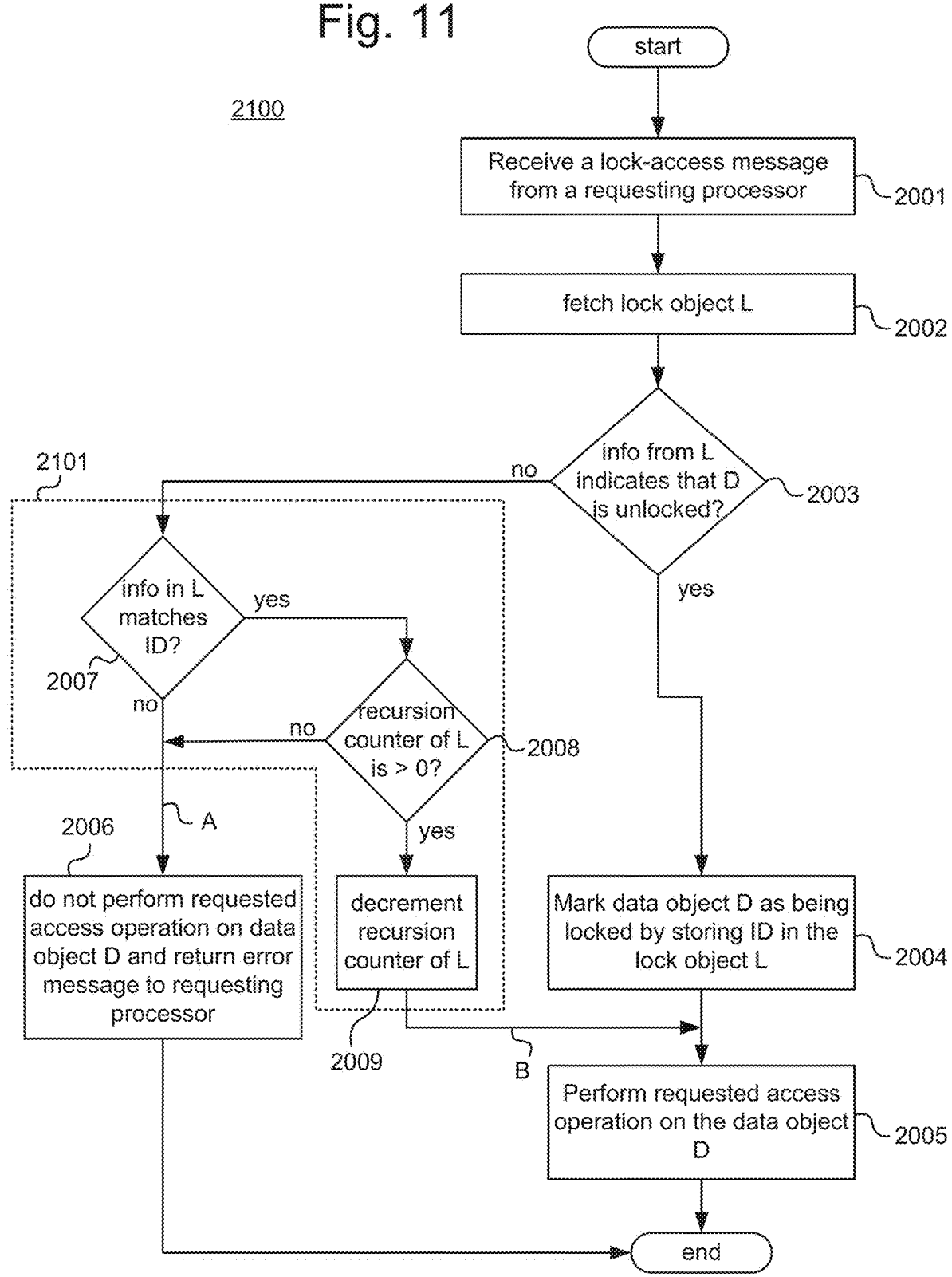

CAPABILITY BASED LOCKING AND ACCESS OF SHARED PERSISTENT MEMORY

BACKGROUND

In certain computer architectures, a computing system may comprise multiple distinct computing nodes, each with its own processing circuitry (e.g., CPU, SoC, etc.), that may be tightly coupled through a fast fabric, enabling the computing nodes to see a globally accessible pool of low latency, byte addressable persistent memory. Occasionally such architectures may be described as "rack-scale", and therefore a computing system based on such an architecture may be referred to herein as a rack-scale system. Certain example rack-scale systems may include on the order of thousands of computing nodes and petabytes of global persistent memory.

BRIEF DESCRIPTION OF THE DRAWINGS

FIG. 11 is a process flow diagram illustrating another example process that may be performed in response to receiving a lock-access message.

DETAILED DESCRIPTION

Figure 1:
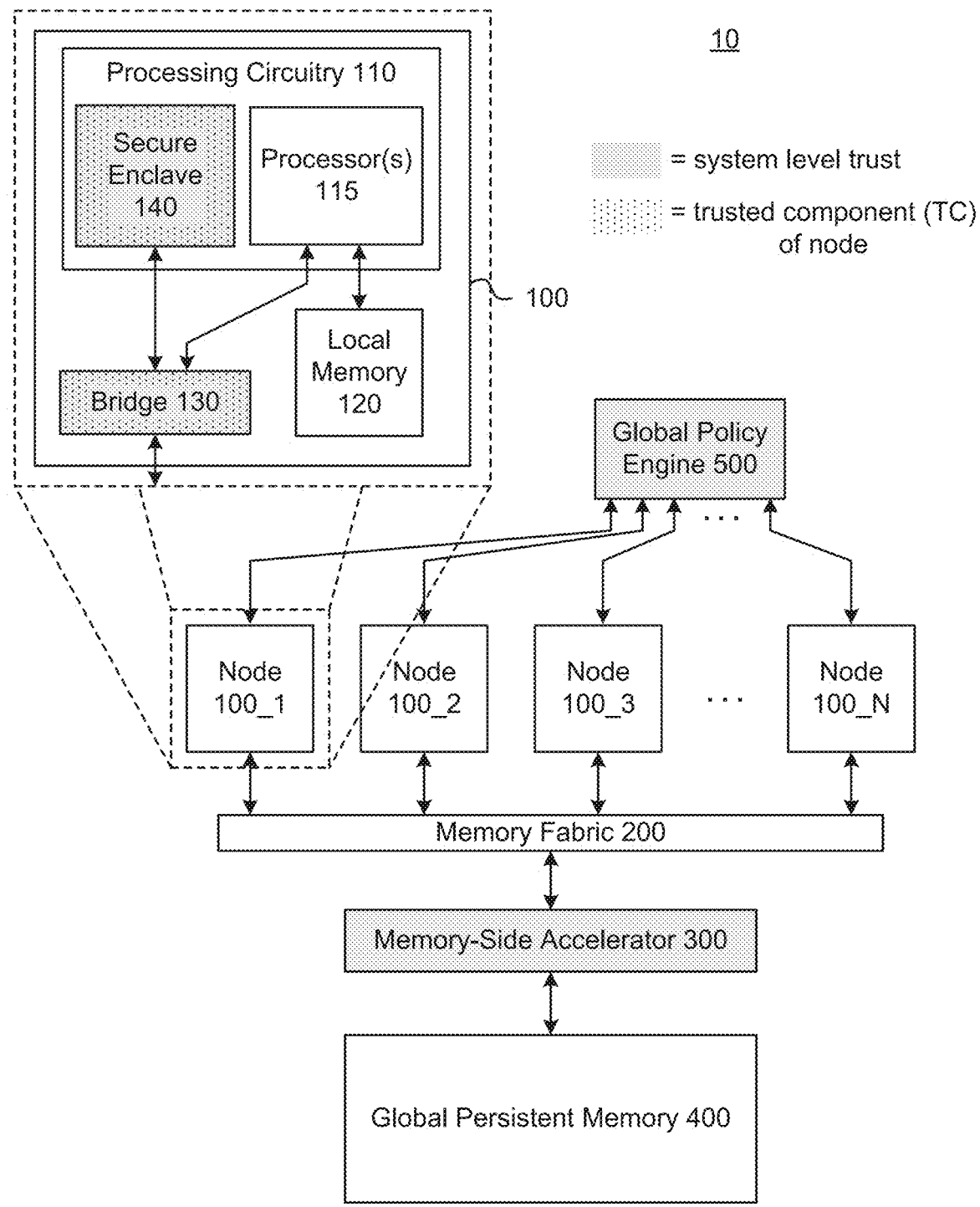
FIG. 1 is a block diagram illustrating an example rack-scale system that includes example nodes connected via a memory fabric to global persistent memory.

In example rack-scale systems described herein, memory capabilities are used in messages to request certain memory transactions (e.g., load request, store request, etc.) with the global persistent memory. As used herein, a "memory capability" is an unforgeable pointer that grants a particular type (or types) of access to a specific data object or data structure (i.e., to a specific address or range of addresses in an address space). The data object (range of address space) that a memory capability grants access to may be as small as the smallest addressable object in the persistent memory (e.g., a byte) or as large as the entire address space. A memory capability is distinguished from a regular pointer at least in that: (1) the memory capability is unforgeable while a regular pointer is forgeable, and (2) the memory capability carries with it specified access permissions (e.g., read-only, read & write, etc.) while the regular pointer does not. In certain examples, the unforgeablity of the memory capability may be ensured by the design of the system as a whole—for example, the instruction set of the computing nodes may be such that a node cannot expand the privileges granted by the memory capability (e.g., permissions may be disclaimed but not granted, the range may be reduced but not expanded).

By properly controlling the allocation of memory capabilities within a system, fine-grained memory access protection may be enabled, since a process and/or node may access a given physical memory address of the persistent memory only if they have a memory capability that grants access thereto, which cannot be forged, and then may perform only the types of accesses on the physical memory address that are permitted by the memory capability. Such fine-grained memory access may avoid many bugs and security compromises that may result from unauthorized access to memory, such as buffer and stack overflows. For example, in certain example systems, a node may be allocated a region of the global persistent memory that it is allowed to access by creating a memory capability for the region and providing the memory capability to the node.

When two or more nodes both have been granted access to the same region of the global persistent memory, mutually exclusive access to an address (or range of addresses) in the region may be achieved in various ways. For example, if a node desires to perform an access operation (e.g., read, write, modify) on a particular data object, an atomic access operation may be used to perform the access, which may prevent the other nodes from concurrently accessing the data object while the atomic access operation is being processed. However, in certain examples a node may desire to perform multiple access operations on one or more data objects atomically (i.e., with assurance that none of the data objects will be changed by another node before all of the access operations have been completed); this may be achieved, for example, via a locking mechanism. In particular, a locking mechanism allows a target data object (or, in some examples, a range of addresses) to be "locked" for a specific node, which prevents other nodes from accessing the address until the address is "unlocked" or "released".

In certain example rack-scale systems described herein that implement memory capability-based memory access protections, the instruction set of the processors and a memory-side accelerator ("MSA") that controls access to the global persistent memory may be such that a processor may use a single message (hereinafter a "lock-access message") to simultaneously request from the MSA that a particular access operation (e.g., load, store) be performed on a target data object and that the target data objected be locked for the processor. More specifically, such a lock-access message may include at least two memory capabilities—a memory capability ("first memory capability") that points to the target data object in the persistent memory for which the access operation is being requested, and a memory capability ("second memory capability") that points to a lock object in the persistent memory that controls locking of the target data object. The MSA may, in response to a lock-access message, fetch the data stored in the lock object pointed to by the second memory capability and determine, based on the fetched data, whether to lock the target data object for the requesting processor and perform the requested access operation on the target data object. For example, if the lock object does not include an identifier of an entity (e.g., a processor, a process, a thread, a node, etc.), then the MSA may allow the target data object to be locked for the requesting entity, which may be indicated by the MSA storing an identifier of the requesting entity in the lock object, and the requested access operation may be performed. As another example, if the lock object stores an identifier of another entity (e.g., processor, process, thread, etc.), then the MSA may reject the request to lock the target data object and the requested access operation, since the target data object is already locked for another entity.

Furthermore, in certain examples the instruction set of the processors and the MSA may be such that a processor may use a single message (hereinafter an "access-unlock message") to the MSA to simultaneously request that a particular access operation (e.g., load, store) be performed on a data object and that the data object be unlocked. More specifically, such an access-unlock message may include at least two memory capabilities—a memory capability ("third memory capability") that points to the target data object, and a memory capability ("fourth memory capability") that points to the lock object that locks the target data object. The MSA may, in response to an access-unlock message, fetch the data stored in the lock object pointed to by the fourth memory capability and determine, based on the lock object, whether to unlock the target data object for the requesting processor and perform the requested access operation on the target data object. For example, if the lock object includes an identifier of the requesting entity, then the MSA may allow the requested access operation to be performed and may allow the target data object to be unlocked, which may be indicated by the MSA clearing (e.g., storing all zeros in) the lock object. As another example, if the lock object is empty or includes an identifier of another entity, then the MSA may reject the request to unlock the target data object and the requested access operation, since the target data object is not locked or is locked for another processor.

The lock-access message and the access-unlock message may allow the number of messages that are sent between a given node and the MSA incident to a locking mechanism to be greatly reduced. In particular, in an alternative approach to providing a locking mechanism, a lock of a data object is requested in a first message from a node to the MSA. If the lock is obtained, then this is acknowledged as a second message from the MSA to the node and then access operations are requested as subsequent messages from the node to the controller (each with a corresponding return message from controller to node). When the desired access operations have been completed, an unlock is requested in a penultimate message from the node to the controller, followed by a final message from the controller to the node acknowledging the unlock. Thus, in such an alternative approach, if there are N access operations to be performed on the locked data object, the total number of messages between the node and the MSA is 2N+4. However, in examples described herein in which the lock-access message and access-unlock messages are used, the total number of messages between the node and the MSA is 2N. This reduction in the number of messages may be particularly effective for small N—for example, for N=2 the number of messages is reduced by 50%, for N=3 the number of messages is reduced by 40%, for N=4 the number messages is reduced by 33%, and so on. In a large rack-scale system with a large amount of shared persistent memory, the latency resulting from sending a message between a node and the shared persistent memory can be orders of magnitude higher than an access of local memory, and therefore the above-noted reductions in the numbers of messages that are sent can greatly reduce the overall latency of the system.

FIG. 1 illustrates an example rack-scale system 10. The example system 10 may include multiple nodes 100 (e.g., nodes 100_1 through 100_N) which may be connected to a global persistent memory (persistent memory) 400 via a memory fabric 200 and an MSA 300. The example system 10 may also include a global policy engine 500.

An example of one of the nodes 100 is illustrated in FIG. 1 in an expanded view, indicated by dashed lines. Each of the nodes may include processing circuitry 110, local memory 120, and a memory fabric bridge 130. Aside from the fact that each node includes the processing circuitry 110, local memory 120, and a memory fabric bridge 130, the nodes 100 do not necessarily need to be identical to one another; for example, the numbers and/or types of processors 115 per node 100 may vary, the types and sizes of local memory 120 per node 100 may vary, and so.

The processing circuitry 110 may include a number of processors 115 and a secure enclave 140. In certain examples, the processing circuitry 110 may also include additional components that may support the processors 115 and/or provide additional functionality, such as caches, coprocessors, timing sources, etc. In certain examples, such additional components may be integrated into a same integrated circuit as the processor; for example, the processing circuitry 110 may be a system-on-chip (SoC).

The processors 115 may be configured to implement an instruction set that includes the lock-access instructions and/or the access-unlock instructions described below. For example, the processors 115 may be designed according to an instruction set architecture that enables the processors 115 to execute the lock-access instructions and/or the access-unlock instructions described below such that, when these instructions are invoked at a processor 115, the processor 115 performs the operations described below in relation to FIGS. 3 and/or 7. The processors 115 may also run a main operating system (OS) for the node 100, as well as various other processes and computer programs.

The secure enclave 140 may be an element in the processing circuitry 110 that is to execute processes outside the control of the main operating system (OS) running on the processing circuitry 110. The secure enclave 140 may be formed, for example, by a processor or coprocessor executing machine readable instructions, dedicated hardware (such as application-specific integrated circuits (ASICs), complex programmable logic devices (CPLDs), field-programmable gate arrays (FPGAs), application-specific instruction set processors (ASIP), etc.), or any combination of these.

The local memory 120 may be any memory device that is locally accessible to the processing circuitry 110. For example, the local memory 120 may be dynamic random-access memory (DRAM). The local memory 120 may, for example, store machine readable instructions that are to be executed by the processors 115.

The memory fabric bridge 130 may provide a bridged connection to the memory fabric 200. In certain examples, the memory fabric bridge 130 includes a programmable hardware element (such as, for example, a firewall) that allows the configuration of access control rules that dictate regions of the global persistent memory 400 that are accessible from the OS running on that node 100. For example, the memory fabric bridge 130 may, under the control of the secure enclave 140, create a mapping of a region of the global persistent memory 400 into the physical address space of the node 100 (hereinafter an "aperture"). Specifically, the access-control rules of the memory fabric bridge 130 may be configured via in-band memory transactions issued from the secure enclave 140 that target specific memory mapped bridge control registers of the memory fabric bridge 130. The memory fabric bridge 130 may verify that accesses to these registers originate from the secure enclave 140, ensuring that no entity outside the secure enclave 140 can change the access-control rules. The aperture mappings created by the access control rules map physical addresses on the node 100 to addresses in the persistent memory 400, making the corresponding region of the persistent memory 400 accessible by the node 100.

Figure 2:
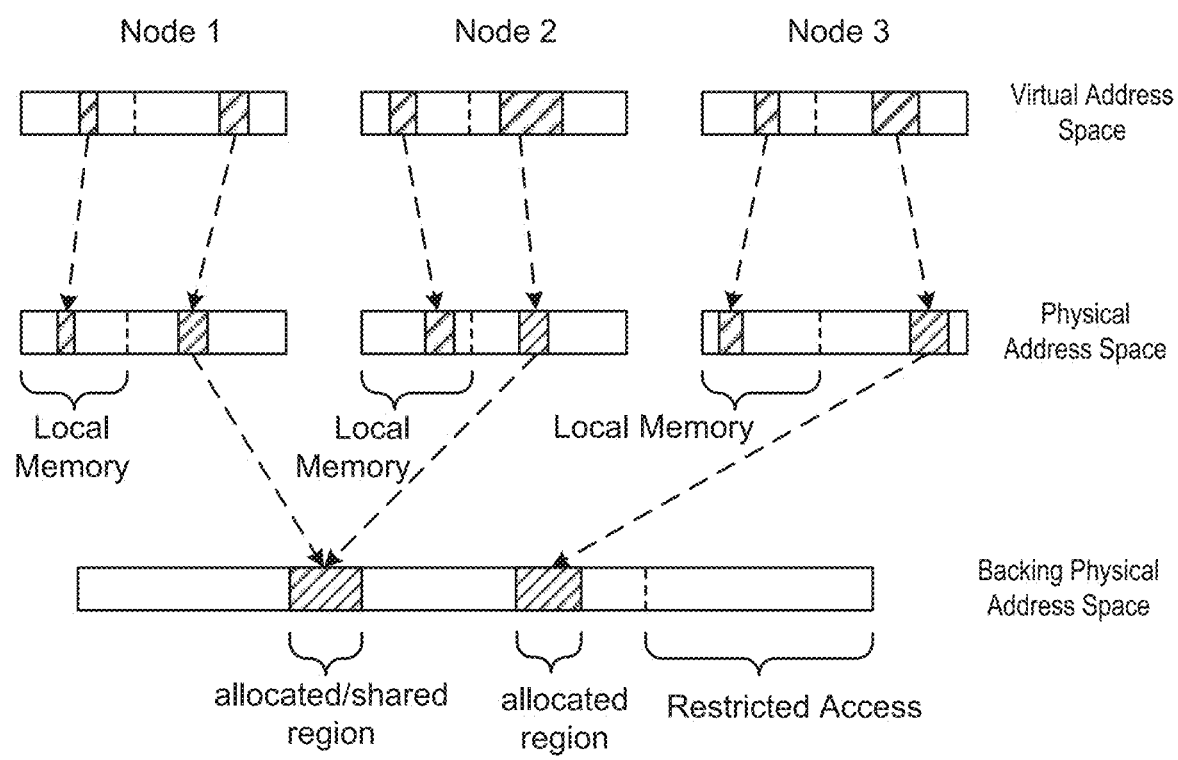
FIG. 2 is a block diagram illustrating example address spaces and address mappings in an example rack-scale system.

For example, FIG. 2 illustrates an example mapping of address spaces in the system 10. Each node 100 may have a virtual address space (VAS) that maps to a physical address space (PAS) of the node 100. A subset of the addresses in the PAS of the node 100 may correspond to physical addresses in the local memory 120 of the node 100, while the remaining addresses in the PAS may be used for mapping to a backing physical address space (BPAS). The addresses of the BPAS may correspond to physical addresses in the global persistent memory 400. When an aperture is created for a given node 100, this provides a mapping between addresses in the PAS of the node 100 and a subset of addresses in the BPAS (e.g., to a region of the persistent memory 400). Multiple nodes 100 may be granted access to a same region of the persistent memory 400 by, among other things, providing apertures for the sharing nodes 100 that map addresses from their respective PASs to the same addresses of the BPAS. In certain examples, the nodes 100 may all use the same VAS and PAS, and may map VAS addresses to PAS addresses identically. In certain examples, the processors 115 of a node 100 may control mappings between the VAS and the PAS of the node 100, while mappings between the PAS and the BPAS may be controlled exclusively by the secure enclave 140 of the node 100.

Processes running within the secure enclave 140 together with the memory fabric bridge 130 form a trusted component (TC) of the node 100, which has system level trust and enables setup and enforcement of source-level global memory controls. In particular, only the secure enclave 140 may set up apertures for the node 100 that are enforced by the memory fabric bridge 130, create an original memory capability (i.e., one that is not derived from a memory capability that is already accessible to the given node 100) corresponding to the region of the persistent memory 400. In certain examples, the secure enclave 140 may also create a token of authority for the original memory capability. Thus, because the TC is securely separated from the OS on the node 100, the OS cannot change the access-control rules, create an original memory capability, or create a token of authority without intervention from the TC. For example, if the OS operating on the node 100 wants to obtain access to a region of the persistent memory 400, the OS may request from the TC that a region of the persistent memory 400 be allocated to the node 100. The TC may decide whether or not to allocate the region to the persistent memory 400 based on policies that are set by the global policy engine 500.

In certain examples, once the TC has provided an original memory capability for a region of the persistent memory 400 to a node 100, the node 100 may freely derive additional memory capabilities ("derived memory capabilities") from the original memory capability. Derived memory capabilities may have strictly equal-or-reduced range and access privileges relative to the original memory capability; in other words, a derived memory capability corresponds to the same object as the original memory capability or an object contained entirely therein, and provides the same or lesser access privileges as the original memory capability. The node 100 may use these memory capabilities (together with a token of authority in certain examples) to obtain access to data objects in the region of the persistent memory 400. For example, the node 100 may send memory access messages to the MSA 300 that include a derived memory capability and a token of authority, and the MSA may perform the requested access on the data object specified by the memory capability upon verifying the integrity of the message and the authenticity of the token of authority.

As noted above, in certain examples a token of authority may be created for certain memory capabilities. In such examples, the token of authority that is created by the TC may be any token that the MSA 300 may recognize as providing its bearer authority to access a region of the persistent memory 400. In some examples, messages that include multiple memory capabilities may use a single token of authority for both memory capabilities; in other examples, each memory capability may have its own token of authority. In certain examples, no additional token of authority is included with the memory capability; in such cases, for example, the memory capability itself may carry all the authority that is needed to access an object in the memory 400.

An example of a token of authority may include a handle to a master capability that is associated with a memory capability. For example, when the TC allocates a region of the persistent memory 400 to a node 100, it may create a new master memory capability that may be stored in a restricted region of the persistent memory 400, and the token of authority may comprise a handle to the master memory capability. Upon receiving a memory access message, the MSA 300 may fetch the master memory capability corresponding to the handle and may allow or disallow the access to the region pointed to by the memory capability based on the fetched master memory capability. For example, if the master memory capability indicates that the handle is invalid (e.g., a generation number of the handle does not match a generation number of the master memory capability), then the associated memory capability is considered invalid and the access to the region is denied.

The memory fabric 200 may include any number of busses, network connections, and/or other communications media that are to communicate memory access messages and responses (including a data payload where applicable) between the nodes 100 and the MSA 300. For example, the memory fabric 200 may include interconnects, switches, routers, etc. In certain examples, memory fabric 200 level mechanisms are used to support the trust model of the system 10. For example, memory access messages issued by a component (e.g., processing circuitry 110, MSA 300, etc.) connected to the memory fabric 200 can include an authenticated cryptographically-verifiable integrity checksum. On receiving a fabric packet, components can validate both the integrity of the transaction (e.g. that it was not modified in flight) and the authenticity of the transaction issuer (e.g. it was not injected into the fabric by an un-authorized entity). The authenticated integrity checksum may act as an admission control mechanism for the memory fabric 200—any un-authenticated packets will be rejected by source and target nodes of the memory fabric 200. Although the memory fabric bridge 130 is described above as a component of the node 100, this is merely for convenience of description and in certain examples the memory fabric bridge 130 may be considered to be a component of the memory fabric 200. Similarly, in certain examples the MSA 300 may be considered to be a component of the memory fabric.

For simplicity, validation of memory capabilities via tokens of authority and authenticating fabric packets via integrity checksums are not explicitly mentioned in the descriptions below. However, it should be understood that in certain examples the operations described below that are performed by the MSA 300 in response to various messages may be contingent on a token of authority being valid and/or authentication of integrity checksums.

The MSA 300 is to control access to the persistent memory 400. For example, the MSA 300 may be to perform operations such as those described below in relation to FIGS. 4, 8, and 11-13. For example, the MSA 300 may include dedicated hardware (such as ASICs, CPLDs, FPGAs, ASIP, etc.) that is configured to perform functions described herein, a processor executing machine readable instructions to perform functions described herein, or any combination of these. In FIG. 1, one MSA 300 is illustrated, but the system 10 may include any number of MSAs 300. For example, there may be multiple MSAs 300 that respectively control access to different regions of the persistent memory 400. As another example, the persistent memory 400 may be composed of multiple discrete memory devices, and there may be an MSA 300 provided for each discrete memory device.

The global persistent memory 400 may include a number of persistent memory devices. Specifically, the persistent memory device(s) of the persistent memory 400 store information persistently relative to the nodes 100 in a byte-addressable manner. Storing information persistently relative to the nodes 100 means that the stored information has a lifetime independent of individual nodes 100. In other words, the persistent memory device(s) of the persistent memory 400 are "persistent" in the sense that any or all of the nodes 100 may be turned off or reset without affecting the lifespan of the information stored in the persistent memory 400. The persistent memory device(s) of the persistent memory 400 may be non-volatile memory devices, or volatile memory devices. Non-volatile memory devices store information non-volatilely, meaning that the information persists even after power is removed from the device, while volatile memory devices store information volatilely, meaning that the information is lost when power is removed from the device. Examples of non-volatile memory devices that may be used in the persistent memory 400 include: memristor-based random-access memory (RAM), flash memory, phase-change memory element based RAM (sometimes referred to as PCM or PCRAM), a conductive-bridging memory element RAM (sometimes referred to as CBRAM or a programmable metallization cell), magnetoresistive memory element based RAM (sometimes referred to as MRAM), Ferroelectric RAM (sometimes referred to as FeRAM), battery-backed RAM, or the like. Examples of volatile memory devices that may be used in the persistent memory 400 include static RAM (SRAM), dynamic RAM (DRAM), etc.

The global policy engine 500 may be to set access policies for the global persistent memory 400. For example, the global policy engine 500 may be securely connected to the secure enclave 140 in each node 100, and may communicate access policies to the secure enclaves 140 that control how the secure enclaves 140 allocate regions of the persistent memory 400. For example, the access policies may control whether a secure enclave 140 will create a given aperture for a given node 100, whether shared access for multiple nodes 100 may be allowed for a given region of the persistent memory, and so on. In certain examples, the global policy engine 500 is formed by a processor executing machine-readable instructions.

Thus, the system 10 may deploy a trust model in which the global policy engine 500, the MSA 300, the memory fabric bridges 130, and the secure enclaves 140 may have system-level trust, whereas the processors 115 on each node 100 have only node-level trust. Specifically, the processors 115 on the node 100 (more specifically, the OS running on the processors 115 and the memory management unit (MMU) of the processors 115) are trusted to enforce fine-grained memory capability access control within broader virtual address space (VAS) access-control over the physical address space (PAS) they are granted access to, but they are not trusted for controlling access to global physical memory on the persistent memory 400. Access to global physical memory on the persistent memory 400 has to be explicitly granted to a node 100 by the TC, which is enforced at the memory fabric bridge 130. Once granted access to a physical region of the persistent memory 400, the node 100 is then trusted for fine-grained (VAS and memory capability) segmentation and isolation of that region along with honoring support for memory capability revocation. Additionally, access to certain regions of the persistent memory 400 can be restricted at the memory fabric bridge 130 level such that those aperture mappings are only accessible by the TC running in the secure enclaves 140—for example, in examples in which master memory capabilities are used, access to master memory capabilities may be restricted to the TC. Thus, in the trust model employed by the system 10 access to the global persistent memory 400 is gated at the 'source' of a memory transaction (i.e., at the node 100), while the 'target' (MSA 300) implicitly trusts memory access messages received over the memory fabric 200 that include valid memory capabilities, although target components can validate the integrity and authenticity of such transactions.

Figure 3:
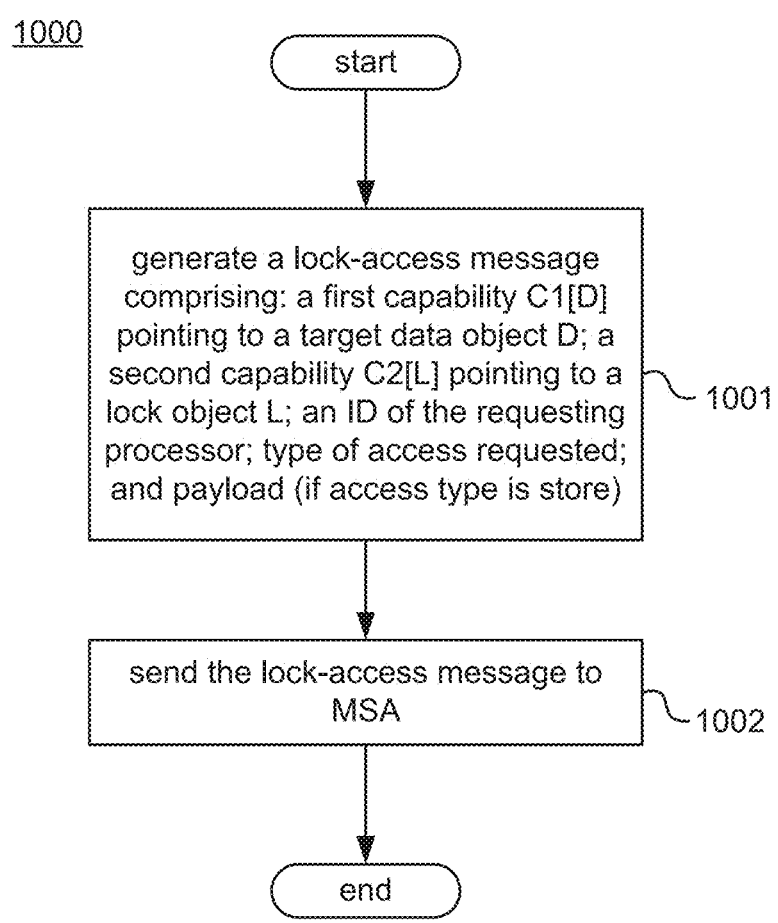
FIG. 3 is a process flow diagram illustrating an example process that may be performed in response to a lock-access instruction being invoked at a processor.

FIG. 3 illustrates an example process 1000 that may be performed by a processor 115 of one of the nodes 100 in response to a lock-access instruction being invoked. For example, an OS or other process running on a node 100 may invoke such an instruction at a processor 115 of the node 100. In particular, an instruction set of the processors 115 may include lock-access instructions that, when invoked at a given processor 115, cause the given processor 115 to perform the operations illustrated in FIG. 3. In other words, the processors 115 may be designed according to an instruction set architecture that enables the processors 115 to appropriately process such lock-access instructions (when invoked) to perform the operations described herein.

As used herein, "lock-access instruction" refers to any instruction, executable by a processor (such as the processor 115) of a rack-scale system (such as the rack-scale system 10), to cause the processor to generate and send a lock-access message to an MSA of the rack-scale system (such as the MSA 300), the lock access message comprising: a first memory capability pointing to the target data object in the persistent memory for which a lock and access is being requested; a second memory capability pointing to a lock object in the persistent memory that controls locking of the target data object (or a region containing the target data object); and an indication of the type of access operation requested. By sending the lock-access message to the MSA, the processor simultaneously requests via a single message both that an access operation be performed on the specified target data object in a globally shared persistent memory of the rack-scale system (such as the persistent memory 400) and that the target data object (or, in certain examples, a specified region of the persistent memory that includes the target data object) be locked for the processor. Because there are multiple types of memory access operations that could be requested, there are multiple distinct instructions that may be classified as "lock-access instructions". Specifically, there may be a particular lock-access instruction for any memory access operation, such as, for example, a load operation that fetches data stored in a data object and returns it to the processor 115 (aka a read operation), a store operation that stores specified data in the data object (aka a write operation), increment/decrement a value, etc. Hereinafter, an instance of a lock-access instruction in which the specified access operation is "load" may be referred to as a "lock-load instruction", while an instance of a lock-access instruction in which the specified access operation is "store" may be referred to as a "lock-store instruction".

In block 1001, the processor 115, in response to a lock-access instruction being invoked, generates a lock-access message comprising: a first memory capability ("C1[D]") pointing to the target data object ("D") in the persistent memory 400 for which a lock and access is being requested; a second memory capability ("C2[L]") pointing to a lock object ("L") in the persistent memory 400 that controls locking of the target data object D (or a region containing the target data object D); and an indication of the type of access operation requested. The lock-access message may also include an identifier corresponding to the requesting entity (e.g., the requesting processor 115) ("ID"), and a data payload if convenient for the type of access requested (e.g., a data payload may be included for a store operation). For example, each lock-access message may include a first field that includes information specifying the type of message (which may implicitly specify the type of access requested), a second field that includes C1[D], a third field that includes C2[L], a fourth field that includes ID, and a fifth field for a data payload (if any). In certain examples, ID is not specified in the lock-access message, and instead ID is determined by the MSA 300 based on source information appended to the lock-access message by the memory fabric bridge 130 and/or the memory fabric 200. Examples of the lock-access message include the message lock-load(C1[D], C2[L], ID) illustrated in FIGS. 5A & 5B and the message lock-store (C1[D], C2[L], ID, payload) illustrated in FIGS. 6A & 6B.

As noted above, ID may be an identifier of an entity that is requesting the lock and access, which may include, for example, a processor 115, a specific process running on a processor 115, a specific thread of the processor 115, a node 100, etc. Similarly, the lock object L may store an identifier of an entity for which the data object D is locked, which may include, for example, a processor 115, a specific process running on a processor 115, a specific thread of the processor 115, a node 100, etc. The type of entity identified by ID need not necessarily be the same as the type of entity identified in the lock object L. Hereinafter, the entities whose identifiers are included in ID and in the lock object L will be described as processors 115, but it should be understood that this is merely one example and that the entities do not have to be processors 115.

In block 1002, the processor 115 sends the lock-access message generated in block 1001 to the MSA 300, via the memory fabric bridge 130 and the memory fabric 200. Although blocks 1002 and 1001 are described separately herein for convenience, in certain examples they may be performed simultaneously (e.g., the sending of the lock-access message may also constitute the generating of the message).

Figure 4:
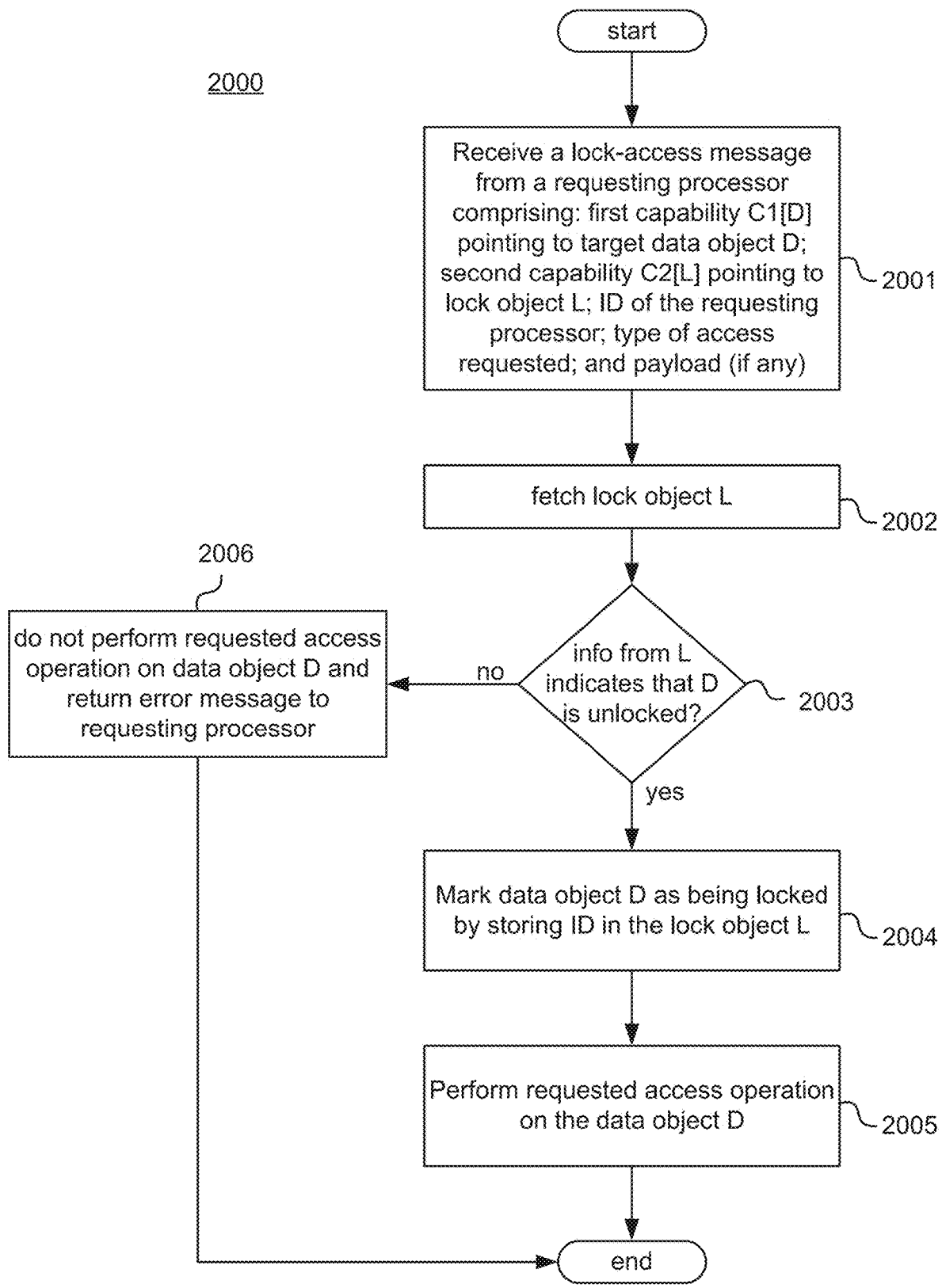
FIG. 4 is a process flow diagram illustrating an example process that may be performed in response to receiving a lock-access message.

FIG. 4 illustrates an example process 2000 that may be performed by the MSA 300 in response to receiving a lock-access message from a given node 100. In particular, logic circuits of the MSA 300 and/or machine readable instructions executed by a processor of the MSA 300 may be such that they cause the MSA 300 to perform the operations illustrated in FIG. 4.

In block 2001, the MSA 300 receives a lock-access message from a requesting processor 115 of a given node 100. As described above in relation to FIG. 3, a lock access message comprises a first memory capability C1[D], a second memory capability C2[L], and an indication of the type of access operation requested. The lock-access message may also include an ID, and, in certain instances, a data payload. Examples of the lock-access message include the message lock-load(C1[D], C2[L], ID) illustrated in FIGS. 5A & 5B and the message lock-store(C1[D], C2[L], ID, payload) illustrated in FIGS. 6A & 6B. The process then continues to block 2002.

In block 2002, the MSA 300, in response to receiving the lock-access message, examines the received message to identify the lock object L that is pointed to by the second memory capability C2[L], and fetches from the persistent memory 400 the data ("data[L]") stored in the lock object L. The process then continues to block 2003.

In certain examples, the lock object L may include multiple fields for storing various pieces of information. For example, the lock object L may store locking information that may be used by the MSA 300 to determine whether a given data object is locked. In certain examples, the locking information may be empty if the data object is unlocked and may include an identifier of entity (e.g., a processor 115) if the data object is locked for that entity. In certain examples, the lock object L may store bounds information, which may specify a region (address range) of the persistent memory 400 for which the lock object L controls locking ("lock region"). In certain examples, the lock object L may store a recursion counter (described below in relation to FIG. 11) and/or a reader counter (described below in relation to FIG. 12). In certain examples, the lock object L may store information specifying a type of lock that is implemented on the data object (in examples in which multiple types of locks may be used; for example, see the description below in relation to FIG. 13).

In block 2003, the MSA 300 determines whether the fetched information data[L] indicates that the target data object D is unlocked. For example, if the lock object L does not store an identifier of a processor 115 (e.g., data[L] is all zeros), then the MSA 300 may determine that the target data object D is unlocked. As another example, if data[L] includes an identifier of a processor 115, then the MSA 300 may determine that the target data object D is locked. More specifically, if the identifier in data[L] matches ID (the identifier corresponding to the requesting processor 115), then the MSA 300 determines that the target data object D is already locked for the requesting processor 115, while if the identifier in data[L] does not match ID, then the MSA 300 determines that the target data object D is locked for another processor 115. As another example, the lock object L may include a locked flag that may be set (e.g., 1) to indicate that the target data object D (or a region containing the target data object D) is locked and reset (e.g., 0) to indicate that the target data object D (or a region containing the target data object D) is unlocked; in such an example, when the locked flag is set, the lock object may also include an identifier of the processor 115 for which the target data object D is locked. If the target data object D is unlocked (block 2003 is answered YES), then the process continues to block 2004. If the target data object D is locked (block 2003 is answered NO), then the process continues to block 2006.

Figure 5A:
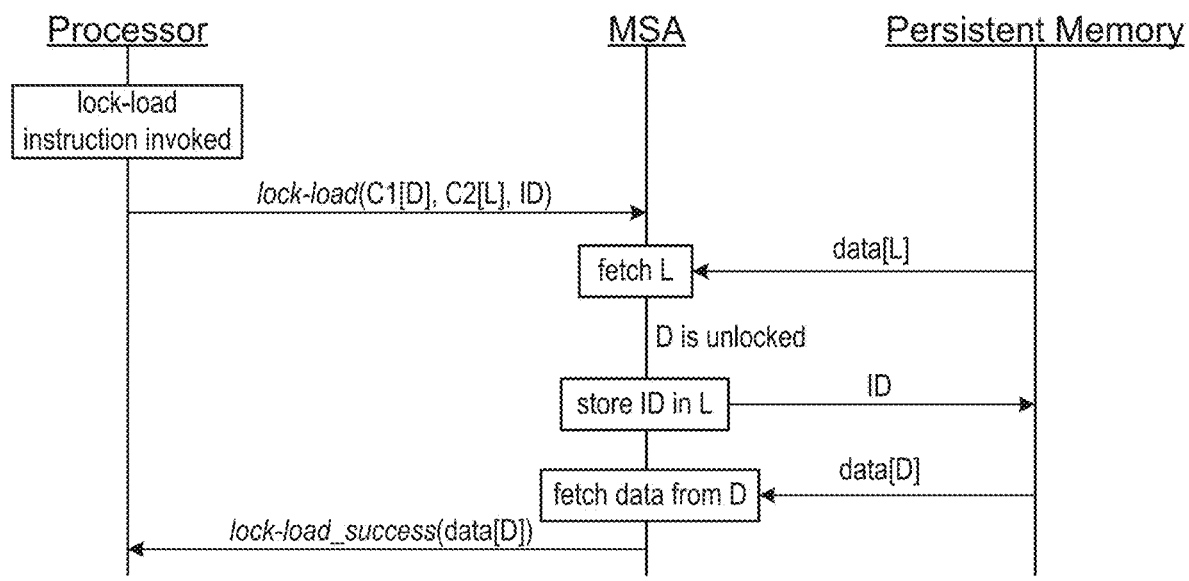
FIG. 5A is a signal diagram illustrating example interactions between a processor, a memory-side accelerator, and global persistent memory when a lock-load instruction is invoked at the processor and a target data object D is unlocked.
Figure 6A:
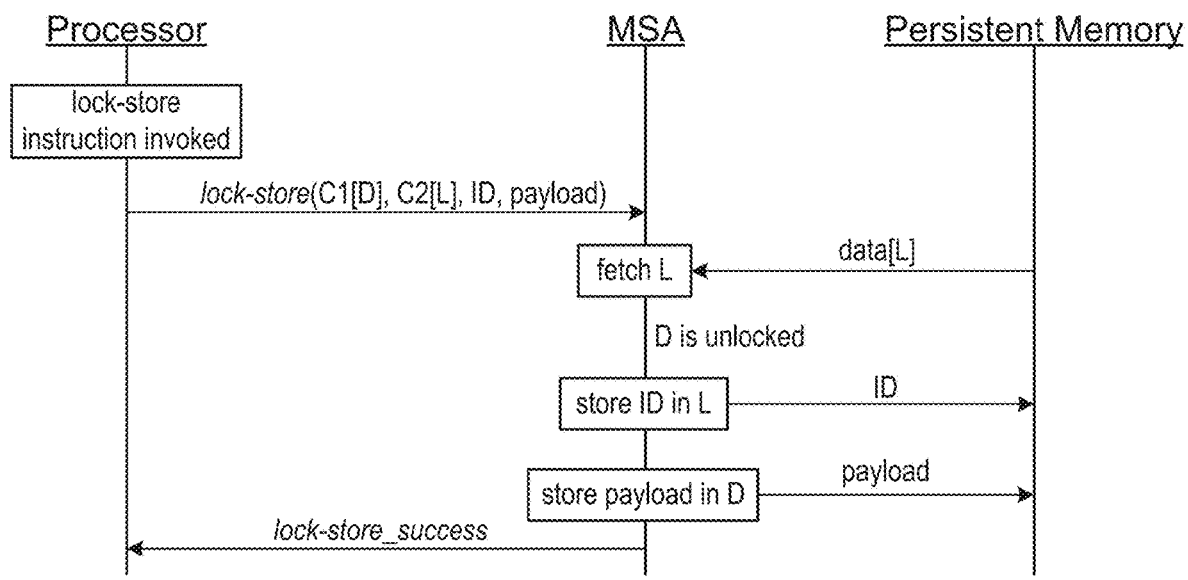
FIG. 6A is a signal diagram illustrating example interactions between a processor, a memory-side accelerator, and global persistent memory when a lock-store instruction is invoked at the processor a target data object D is unlocked.

In block 2004, the MSA 300 marks the target data object D as being locked for the requesting processor 115. For example, the MSA 300 may mark the target data object D as being locked for the requesting processor 115 by storing the ID (the identifier corresponding to the requesting processor) in the lock object L, as illustrated in FIGS. 5A and 6A. The process then continues to block 2005.

In block 2005, MSA 300 performs the requested access operation on the target data object D. For example, if the requested access operation is a load operation, the MSA 300 may fetch the data ("data[D]") stored in the target data object D, as illustrated in FIG. 5A. As another example, if the requested access operation is a store operation, the MSA 300 may store a data payload of the lock-access message in the target data object D, as illustrated in FIG. 6A. The MSA 300 may also return a success message to the requesting processor 115 to indicate that the lock was successfully obtained and the access operation successfully performed. In examples in which the requested access operation was a load, the success message may further include the fetched data[D] as a data payload. Examples of such success messages include the messages lock-load_success(data[D]) and lock-store_success from FIGS. 5A & 6A. In certain examples, blocks 2004 and 2005 may be performed atomically. The process may then end.

Figure 5B:
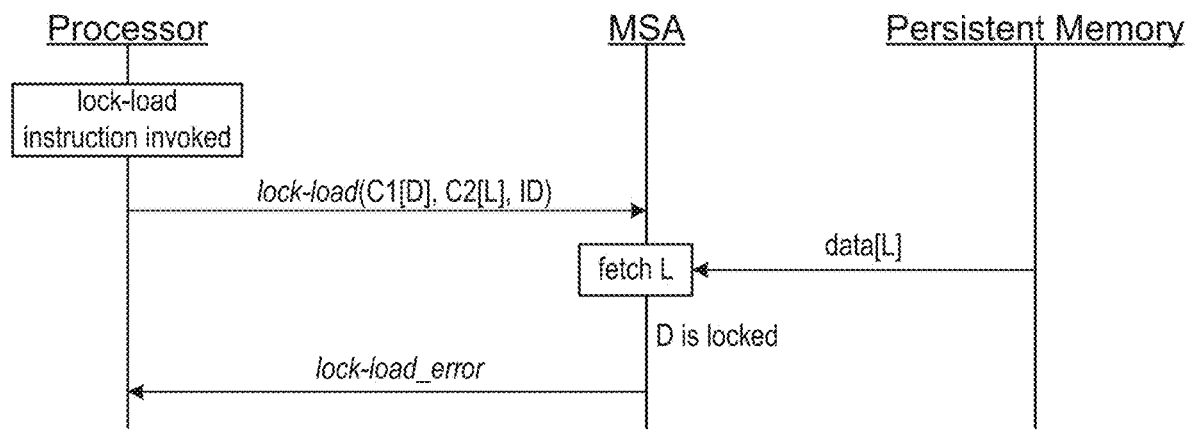
FIG. 5B is a signal diagram illustrating example interactions between a processor, a memory-side accelerator, and global persistent memory when a lock-load instruction is invoked at the processor and a target data object D is locked.
Figure 6B:
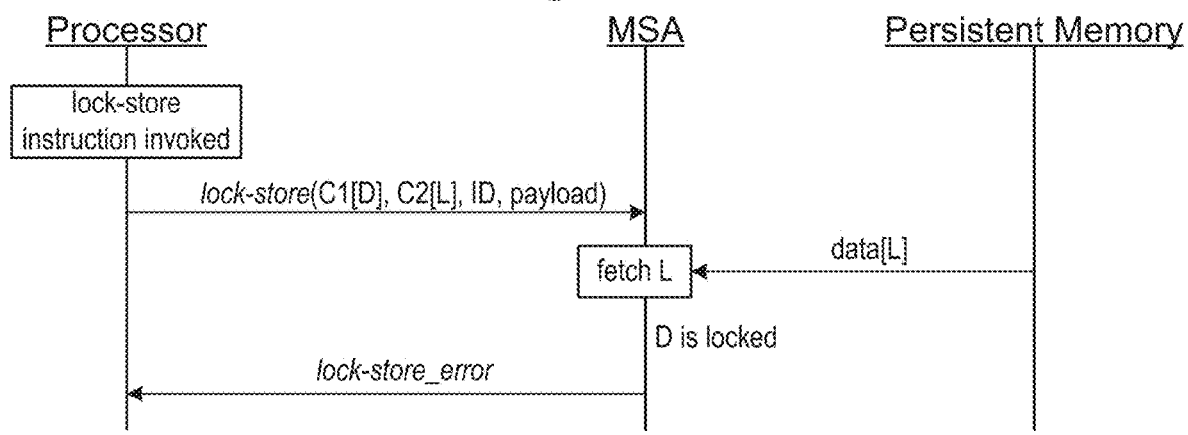
FIG. 6B is a signal diagram illustrating example interactions between a processor, a memory-side accelerator, and global persistent memory when a lock-store instruction is invoked at the processor and a target data object D is locked.

In block 2006, the MSA 300 abstains from performing the requested access operation and abstains from locking the target data object D for the requesting processor 115, as illustrated in FIGS. 5B and 6B. The MSA 300 may also return an error message to the requesting processor 115, indicating that the lock was not obtained and the requested access operation was not performed, as illustrated in FIGS. 5B and 6B. Examples of such messages include the messages lock-load_error and lock-store_error from FIGS. 5B & 6B.

Figure 7:
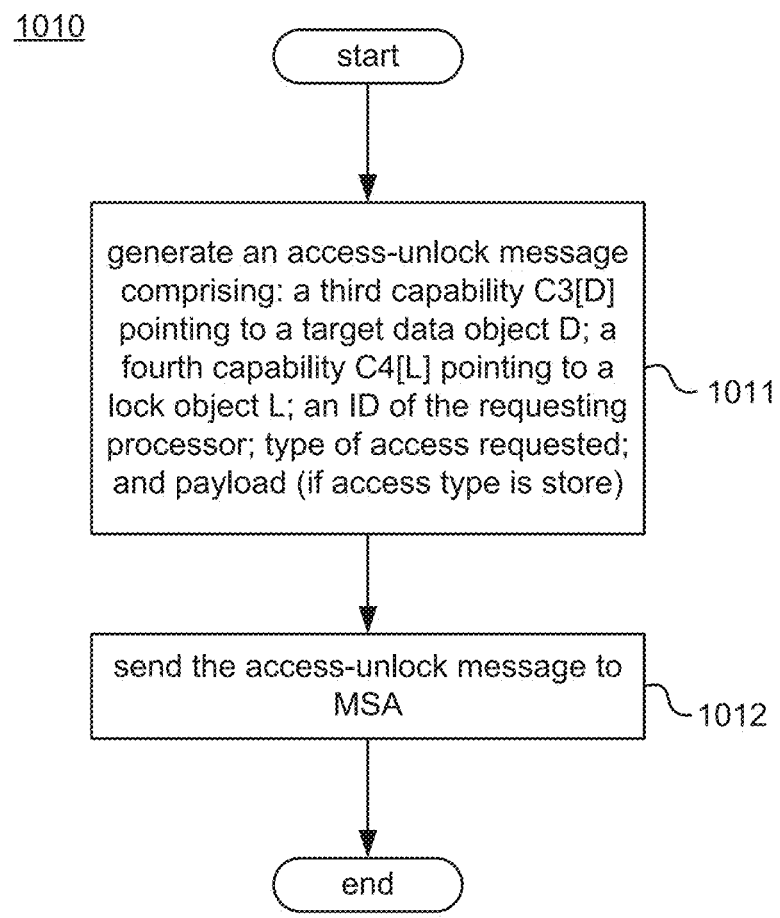
FIG. 7 is a process flow diagram illustrating an example process that may be performed in response to an access-unlock instruction being invoked at a processor.

FIG. 7 illustrates an example process 1010 that may be performed by a processor 115 of one of the nodes 100 in response to an access-unlock instruction being invoked. For example, an OS or other process running on a node 100 may invoke such an instruction at a processor 115 of the node 100. In particular, an instruction set of the processors 115 may include access-unlock instructions that, when invoked at a given processor 115, cause the given processor 115 to perform the operations illustrated in FIG. 7. In other words, the processors 115 may be designed according to an instruction set architecture that enables the processors 115 to appropriately process such access-unlock instructions (when invoked) to perform the operations described herein.

As used herein, an "access-unlock instruction" refers to any instruction, executable by a processor (such as the processor 115) of a rack-scale system (such as the rack-scale system 10), to cause the processor to generate and send an access-unlock message to an MSA of the rack-scale system (such as the MSA 300), the access-unlock message comprising: a third memory capability pointing to the target data object in the persistent memory for which an access and unlock is being requested; a fourth memory capability pointing to a lock object in the persistent memory that controls locking of the target data object (or a region containing the target data object); and an indication of the type of access operation requested. By sending the access-unlock message to the MSA, the processor simultaneously requests via a single message both that an access operation be performed on the specified target data object in a globally shared persistent memory of the rack-scale system (such as the persistent memory 400) and that the target data object (or, in certain examples, a specified region of the persistent memory that includes the target data object) be unlocked. Because there are multiple types of memory access operations that could be requested, there are multiple distinct instructions that may be classified as "access-unlock instructions". Specifically, there may be a particular access-unlock instruction for any memory access operation, such as, for example, a load operation (aka a read operation), a store operation (aka a write operation), etc. Hereinafter, an instance of an access-unlock instruction in which the specified access operation is "load" may be referred to as a "load-unlock instruction", while an instance of an access-unlock instruction in which the specified access operation is "store" may be referred to as a "store-unlock instruction".

In block 1011, the processor 115, in response to an access-unlock instruction being invoked, generates an access-unlock message comprising: a third memory capability ("C3[D]") pointing to the target data object ("D") in the persistent memory 400 for which a lock is being requested; a fourth memory capability ("C4[L]") pointing to a lock object ("L") in the persistent memory 400 that controls locking of the target data object D (or a region containing the target data object); and an indication of the type of access operation requested. The access-unlock message may also include an identifier corresponding to the requesting processor 115 ("ID"), and a data payload if convenient for the type of access requested (e.g., a data payload may be included for a store operation). For example, each access-unlock message may include a first field that includes information specifying the type of message (which may implicitly specify the type of access requested), a second field that includes C3[D], a third field that includes C4[L], a fourth field that includes ID, and a fifth field for a data payload (if any). In certain examples, ID is not specified in the access-unlock message, and instead ID is determined by the MSA 300 based on source information appended to the lock-access message by the memory fabric bridge 130 and/or the memory fabric 200. Examples of the access-unlock message include the message load-unlock(C3 [D], C4[L], ID) illustrated in FIGS. 9A & 9B and the message store-unlock(C3[D], C4[L], ID, payload) illustrated in FIGS. 10A & 11B.

In certain examples, it is possible for the third memory capability C3[D] and fourth memory capability C4[D] of an access-unlock message to be identical to the first memory capability C1[D] and second memory capability C2[D], respectively, of a lock-access message that was previously sent from the processor 115 to the MSA 300. For example, a processor 115 may lock and access a target data object D via a lock-access message, and then may subsequently access and unlock the same target data object D via an access-unlock message (perhaps with intervening accesses of the target data object D between the lock-access message and the access-unlock message).

In block 1012, the processor 115 sends the access-unlock message generated in block 1011 to the MSA 300. Although blocks 1012 and 1011 are described separately herein for convenience, in certain examples they may be performed simultaneously (e.g., the sending of the access-unlock message may also constitute the generating of the message).

Figure 8:
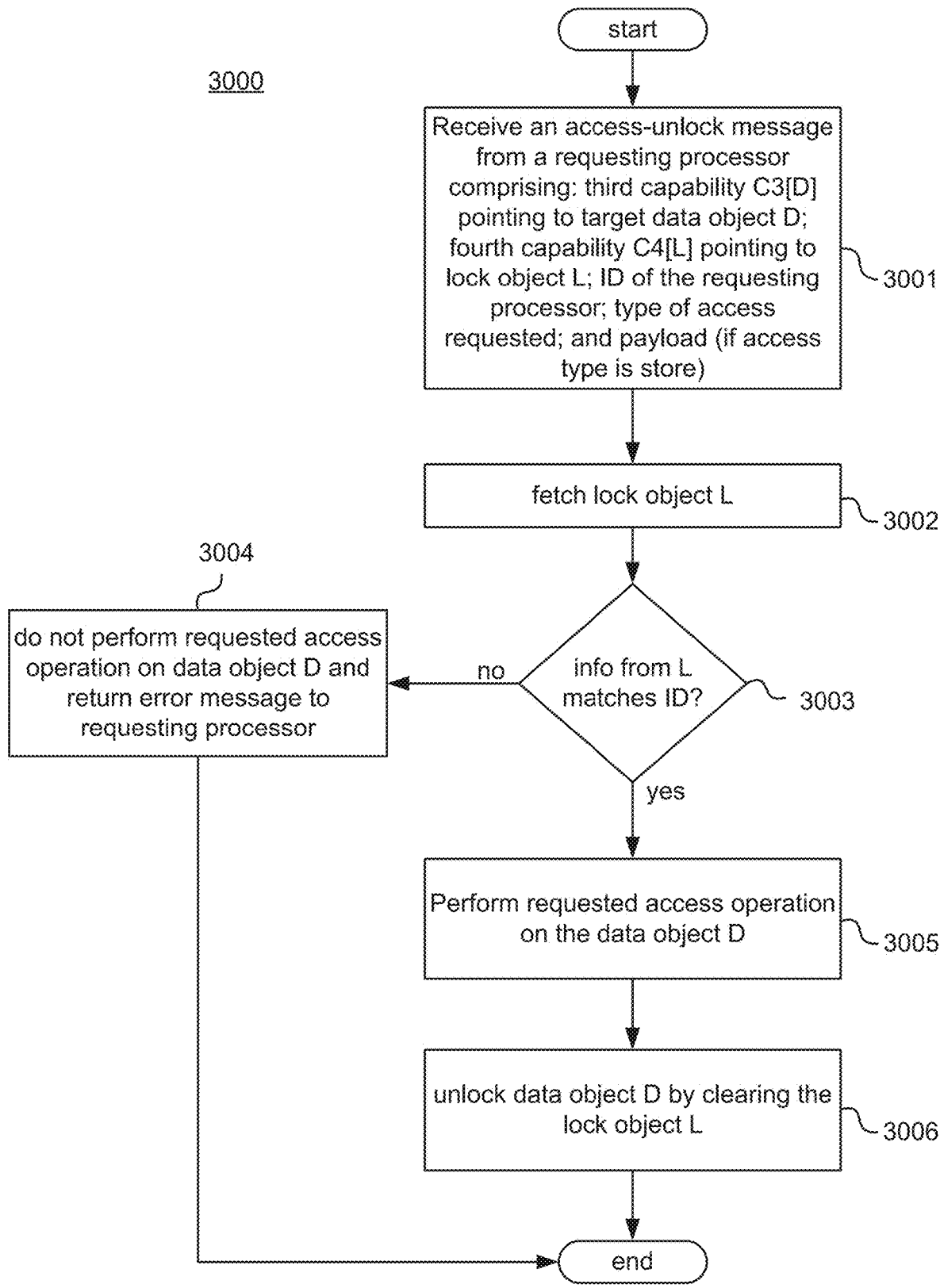
FIG. 8 is a process flow diagram illustrating an example process that may be performed in response to receiving an access-unlock message.

FIG. 8 illustrates an example process 3000 that may be performed by the MSA 300 in response to receiving an access-unlock message from a given node 100. In particular, logic circuits of the MSA 300 and/or machine readable instructions executed by a processor 115 of the MSA 300 may be such that they cause the MSA 300 to perform the operations illustrated in FIG. 8.

In block 3001, the MSA 300 receives an access-unlock message from a requesting processor 115 of a given node 100. As described above in relation to FIG. 7, the access-unlock message comprises the third memory capability C3[D], the fourth memory capability C4[L], and an indication of the type of access operation requested. The access-unlock message may also include an ID, and, in certain instances, a data payload. Examples of the access-unlock message include the message load-unlock(C3[D], C4[L], ID) illustrated in FIGS. 9A & 9B and the message store-unlock(C3[D], C4[L], ID, payload) illustrated in FIGS. 10A & 10B. The process then continues to block 3002.

In block 3002, the MSA 300, in response to receiving the access-unlock message, examines the received message to identify the lock object L that is pointed to by the fourth memory capability C4[L], and fetches from the persistent memory 400 the data ("data[L]") stored in the lock object L. The process then continues to block 3003.

In block 3003, the MSA 300 determines whether the fetched information data[L] indicates that the target data object D is unlocked. If the target data object D is unlocked (block 3003 is answered YES), then the process continues to block 3004. If the target data object D is locked (block 3003 is answered NO), then the process continues to block 3006.

Figure 9A:
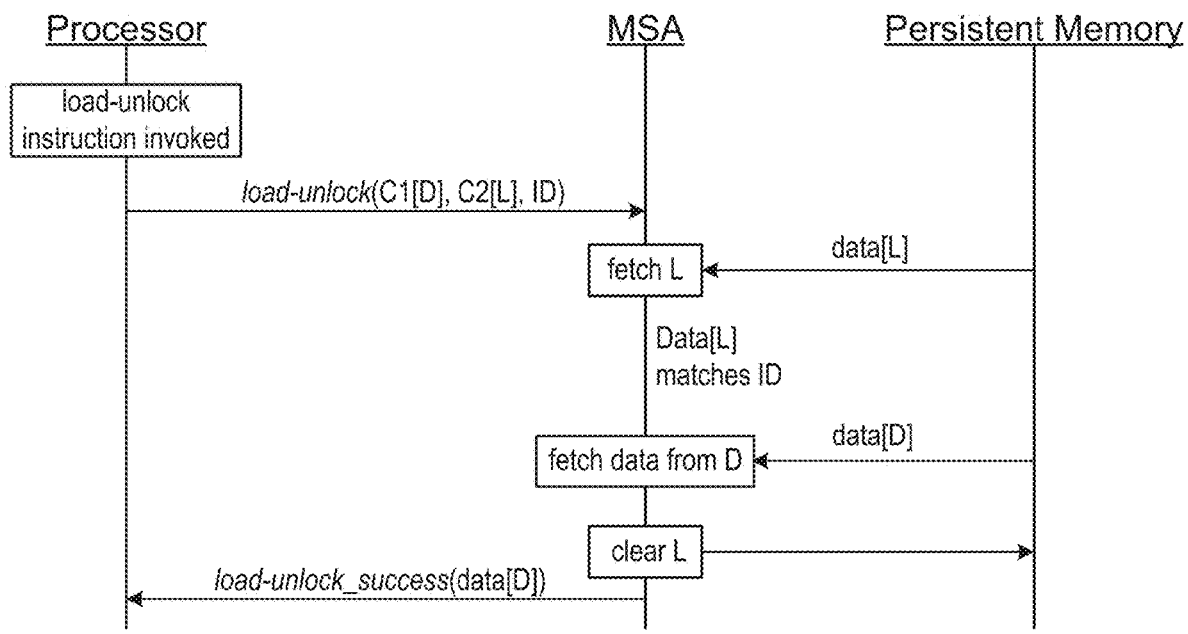
FIG. 9A is a signal diagram illustrating example interactions between a processor, a memory-side accelerator, and global persistent memory when a load-unlock instruction is invoked at the processor and a target data object D is locked for the requesting processor.
Figure 10A:
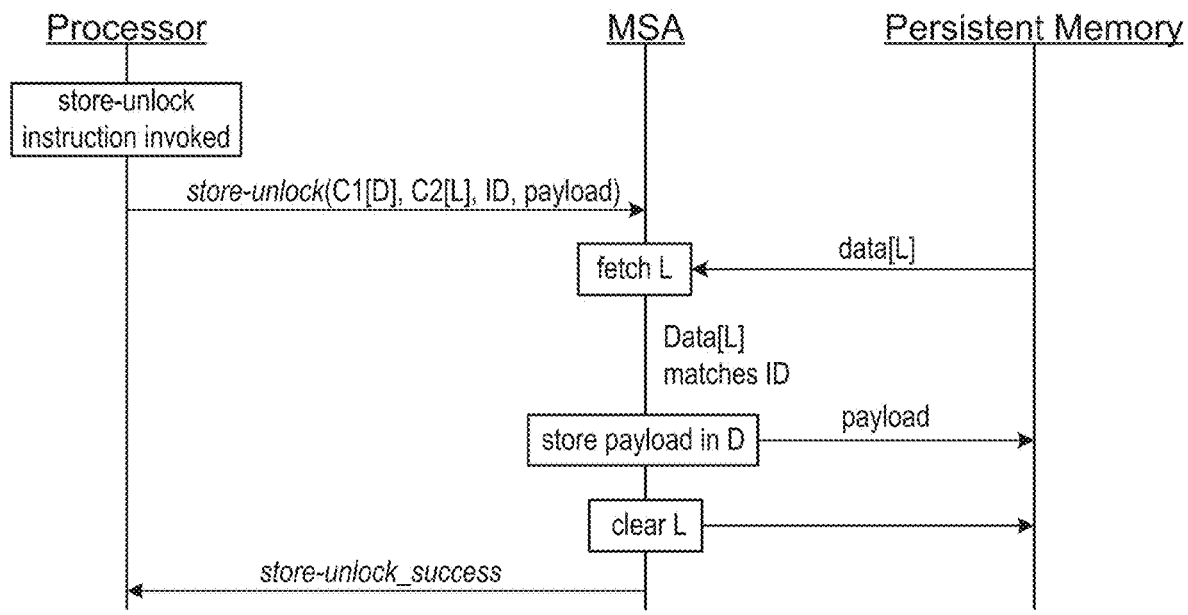
FIG. 10A is a signal diagram illustrating example interactions between a processor, a memory-side accelerator, and global persistent memory when a store-unlock instruction is invoked at the processor and a target data object D is locked for the requesting processor.

In block 3004, MSA 300 performs the requested access operation on the target data object D. For example, if the requested access operation is a load operation, the MSA 300 may fetch the data (data[D]) stored in the target data object D from the persistent memory 400, as illustrated in FIG. 9A. As another example, if the requested access operation is a store operation, the MSA 300 may store a data payload of the access-unlock message in the target data object D, as illustrated in FIG. 10A. The MSA 300 may also return a success message to the requesting processor 115 to indicate that the lock was successfully obtained and the access operation successfully performed. In examples in which the requested access operation was a load, the success message may further include the fetched data[D] as a data payload. Examples of such success messages include the messages load-unlock_success(data[D]) and store-unlock_success from FIGS. 9A & 10A. The process then continues to block 3005.

In block 3005, the MSA 300 marks the target data object D as being unlocked. For example, the MSA may mark the target data object D as being unlocked by clearing (e.g., storing zeros in) all or a portion of the lock object L, as illustrated in FIGS. 9A and 10A. In certain examples, blocks 3004 and 3005 may be performed atomically. The process may then end.

Figure 9B:
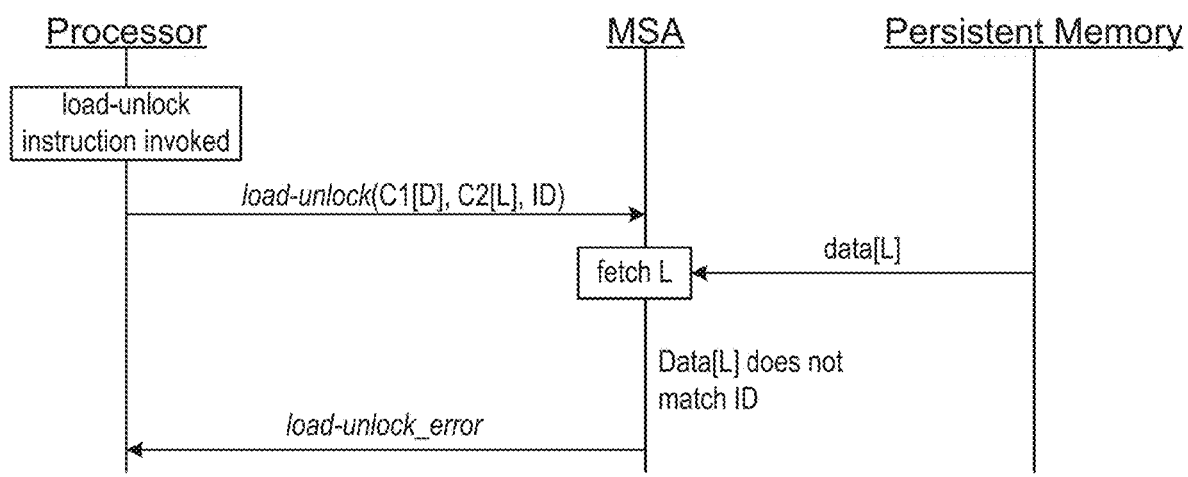
FIG. 9B is a signal diagram illustrating example interactions between a processor, a memory-side accelerator, and global persistent memory when a load-unlock instruction is invoked at the processor and a target data object D is not locked for the requesting processor.
Figure 10B:
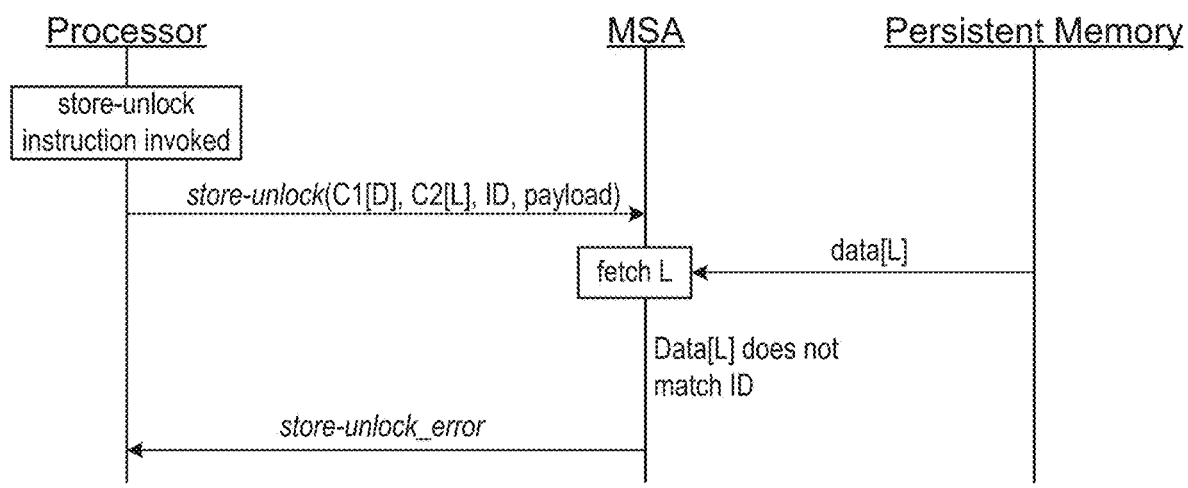
FIG. 10B is a signal diagram illustrating example interactions between a processor, a memory-side accelerator, and global persistent memory when a store-unlock instruction is invoked at the processor and a target data object D is not locked for the requesting processor.

In block 3006, the MSA 300 abstains from performing the requested access operation and abstains from unlocking the target data object D, as illustrated in FIGS. 9B and 10B. The MSA 300 may also return an error message to the requesting processor 115, indicating that the target data object was not unlocked and the requested access operation was not performed, as illustrated in FIGS. 9B and 10B. Examples of such error messages include the messages load-unlock_error and store-unlock_error from FIGS. 9B & 10B.

FIG. 11 illustrates an example process 2100 that may be performed by the MSA 300 in response to receiving a lock-access message from a given node 100. In particular, logic circuits of the MSA 300 and/or machine readable instructions executed by a processor of the MSA 300 may be such that they cause the MSA 300 to perform the operations illustrated in FIG. 11.

The example process 2100 is a variation of the example process 2000. In particular, the example process 2100 comprises the example process 2000 with the addition of a sub-process 2101. Specifically, the example process 2100 includes blocks 2001-2006 that are similar to the blocks 2001-2006 of the example process 2000, and in addition to this the example process 2100 further includes blocks 2007-2009 (which form the sub-process 2101). Blocks 2001-2006 of the example process 2100 are not described in detail below to avoid duplicative description. The description of blocks 2001-2006 above in relation to the example process 2000 may be applicable to blocks 2001-2006 of the example process 2100, with some modifications described below.

The sub-process 2101 is located between block 2003 and block 2006 on the NO branch of the branching resulting from the decision in block 2003. The sub-process 2101 is executed after block 2003 if the result of block 2003 is NO. Blocks 2003 and/or 2006 are modified such that block 2006 is reached via path A of the sub-process 2101, rather than block 2006 being reached directly from block 2003.

Specifically, if the determination of block 2003 is answered NO (data[L] indicates that the target data object D is locked), then the process continues to block 2007. In block 2007, the MSA 300 determines whether an identifier in data[L] matches ID (i.e., whether the target data object D is already locked for the requesting processor). If the answer is YES (identifier in data[L] matches ID), then the process continues to block 2008. If the answer is NO (identifier in data[L] does not match ID), then the process continues to block 2006 via the path A.

In block 2008, the MSA 300 checks a recursion counter associated with the lock object L and determines whether the recursion counter is at a value greater than zero. The recursion counter may be, for example, stored in the lock object L, in which case a portion of the data[L] may correspond to the recursion counter. If the answer to block 2008 is YES (the recursion counter is greater than zero), then the process continues to block 2009. If the answer to block 2008 is NO (the recursion counter is equal to zero), then the process continues to block 2006 via path A.

In block 2009, MSA 300 decrements the recursion counter. For example, if the recursion counter is stored in the lock object L, then the MSA 300 may write to the lock object L in a manner that decrements the recursion counter but maintains the identifier stored in the lock object L. The process then proceeds to block 2005 via path B.

Thus, the sub-process 2101 is added to the example process 2100 to provide an alternative way to handle the phenomena of a processor 115 sending a lock-access message for a target data object D when the target data object D is already locked for that processor 115. In particular, if a processor 115 sends a lock-access message for a target data object D when the target data object D is already locked for that processor 115, this would result in the MSA 300 denying the requested lock and access operation (block 2006) in the example process 2000 of FIG. 4, but may result in the MSA 300 performing the requested access operation in the example process 2100 of FIG. 11.

For example, when a target data object D is locked in response to an access-lock message for a processor 115, the MSA 300 may set the recursion counter to a value n, where n may be specified in the access-lock message or determined according to a default rule. This may allow up to n additional access-lock messages from the same processor 115 to be received by the MSA without resulting in an error, and the requested access operations therein may be performed (block 2005). Any further access-lock messages from the same processor 115 after the recursion counter reaches zero, however, will result in an error (block 2006).

In FIG. 11, the decisions reflected in blocks 2003 and 2007 are illustrated conceptually as being made in two nested yes-no decision blocks for ease of description. However, in certain examples the decisions reflected in decision blocks 2003 and 2007 could be made as part of a single non-binary decision block with three possible outcome paths. For example, it may be determined in a single operation whether data[L] includes: no identifier (if so, go to block 2004), an identifier that matches ID (if so, go to block 2008), or an identifier that does not match ID (if so, go to block 2006).

Figure 12:
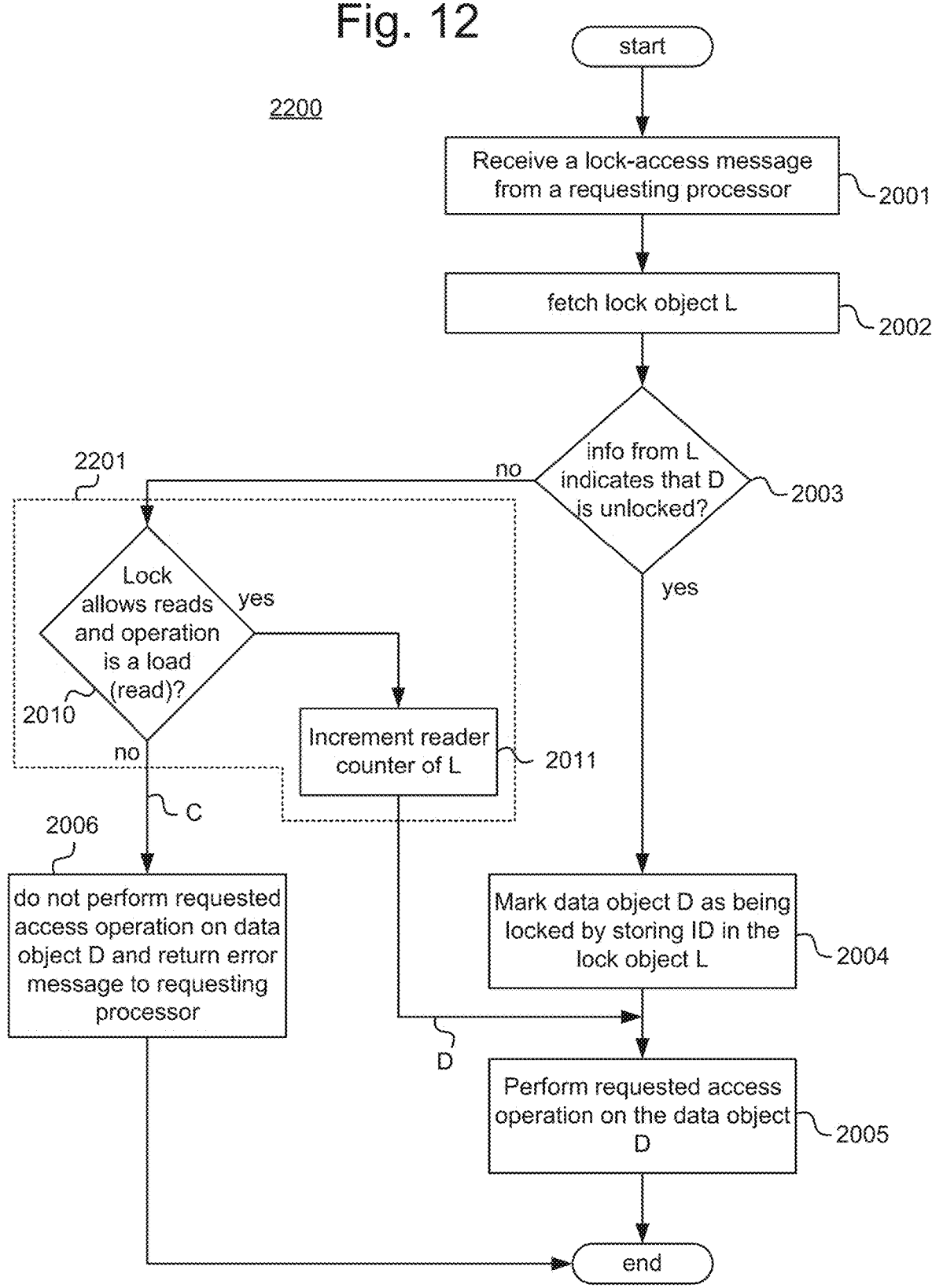
FIG. 12 is a process flow diagram illustrating another example process that may be performed in response to receiving a lock-access message.

FIG. 12 illustrates an example process 2200 that may be performed by the MSA 300 in response to receiving a lock-access message from a given node 100. In particular, logic circuits of the MSA 300 and/or machine readable instructions executed by a processor of the MSA 300 may be such that they cause the MSA 300 to perform the operations illustrated in FIG. 12.

The example process 2200 is a variation of the example process 2000. In particular, the example process 2200 comprises the example process 2000 with the addition of a sub-process 2201. Specifically, the example process 2200 includes blocks 2001-2006 that are similar to the blocks 2001-2006 of the example process 2000, and in addition to this the example process 2100 further includes blocks 2010-2011 (which form the sub-process 2201). Blocks 2001-2006 of the example process 2200 are not described in detail below to avoid duplicative description. The description of blocks 2001-2006 above in relation to the example process 2000 may be applicable to blocks 2001-2006 of the example process 2200, with some modifications described below.

The sub-process 2201 is located between block 2003 and block 2006 on the NO branch of the branching resulting from the decision in block 2003. The sub-process 2201 is executed after block 2003 if the result of block 2003 is NO. Blocks 2003 and/or 2006 are modified such that block 2006 is reached via path C of the sub-process 2201, rather than block 2006 being reached directly from block 2003.

Specifically, if the determination of block 2003 is answered NO (data[L] indicates that the target data object D is locked), then the process continues to block 2010. In block 2010, the MSA 300 determines whether: (1) the type of locking by which the target data object D is locked allows for others to read the target data object D and (2) the type of operation is a "load" (aka read). For example, multiple types of locks may be available, such as an exclusive lock (prevents other processors 115 from any type of access of the target data object), and a read-only lock (prevents other processors 115 from writing to the target data object but allows other processors 115 to read from the target data object). For example, a lock-access message may include an indication of a type lock that is requested. The type of lock may be recorded in the lock object L. For example, the lock object L may include a field for a type of lock. As another example, the reader counter (described below) may be used to indicate a type of lock, with a non-zero value of the reader counter indicating that the type of lock is a read-only lock. If the answer in block 2010 is YES (lock allows reading and requested operation is a load), then the process continues to block 2001. If the answer in block 2010 is NO (lock does not allow reading and/or requested operation is not a read), then the process continues to block 2006 via the path C.

In block 2011, the MSA 300 increments a reader counter associated with the lock object L. The reader counter may be, for example, stored in the lock object L, in which case a portion of the data[L] may correspond to the reader counter. In certain examples, an ID of the requesting processor 115 may also be stored in the lock object L (in addition to the ID of the processor 115 that previously requested the lock). In certain examples, the read counter may be a count of the number of processor ID's stored in the lock object L. Although not illustrated, the reader counter may be decremented in response to a load-unlock message being received. In addition, if the ID of each reading processor 115 is stored in the lock object L, then the ID of the processor 115 that sent the load-unlock message may be deleted from the lock object L. Thus, for example, it may be determined whether there are still any processors 115 reading the target data object by checking the reader counter.

Thus, the sub-process 2201 is added to the example process 2200 to provide an option for multiple types of locks to be requested. In particular, the sub-process 2201 allows a read-only lock to be requested for a target data object D, which may prevent subsequent write requests but may allow read (load) requests by other processors 115. Specifically, if the target data object D is locked when an access-lock message is received (block 2002 is answered NO), then in the example process 2000 the requested access is denied (block 2006) regardless of the type of lock or the type of requested operation, but in the example process 2200 the requested operation may be allowed (via path D) if the type of the lock allows reads and the type of the request is load (read).

In FIG. 12, the decisions reflected in blocks 2003 and 2010 are illustrated conceptually as being made in two nested yes-no decision blocks for ease of description. However, in certain examples the decisions reflected in decision blocks 2003 and 2010 could be made as part of a single non-binary decision block with three possible outcome paths. For example, it may be determined in a single operation whether: data[L] includes no identifier (if so, go to block 2004); data[L] includes an identifier, data[L] indicates a lock type that allows reads, and requested operation is a load (if so, go to block 2011); or data[L] includes an identifier and data[L] indicates a lock type that does not allow reads or a requested operation is not a load (if so, go to block 2006).

Figure 13:
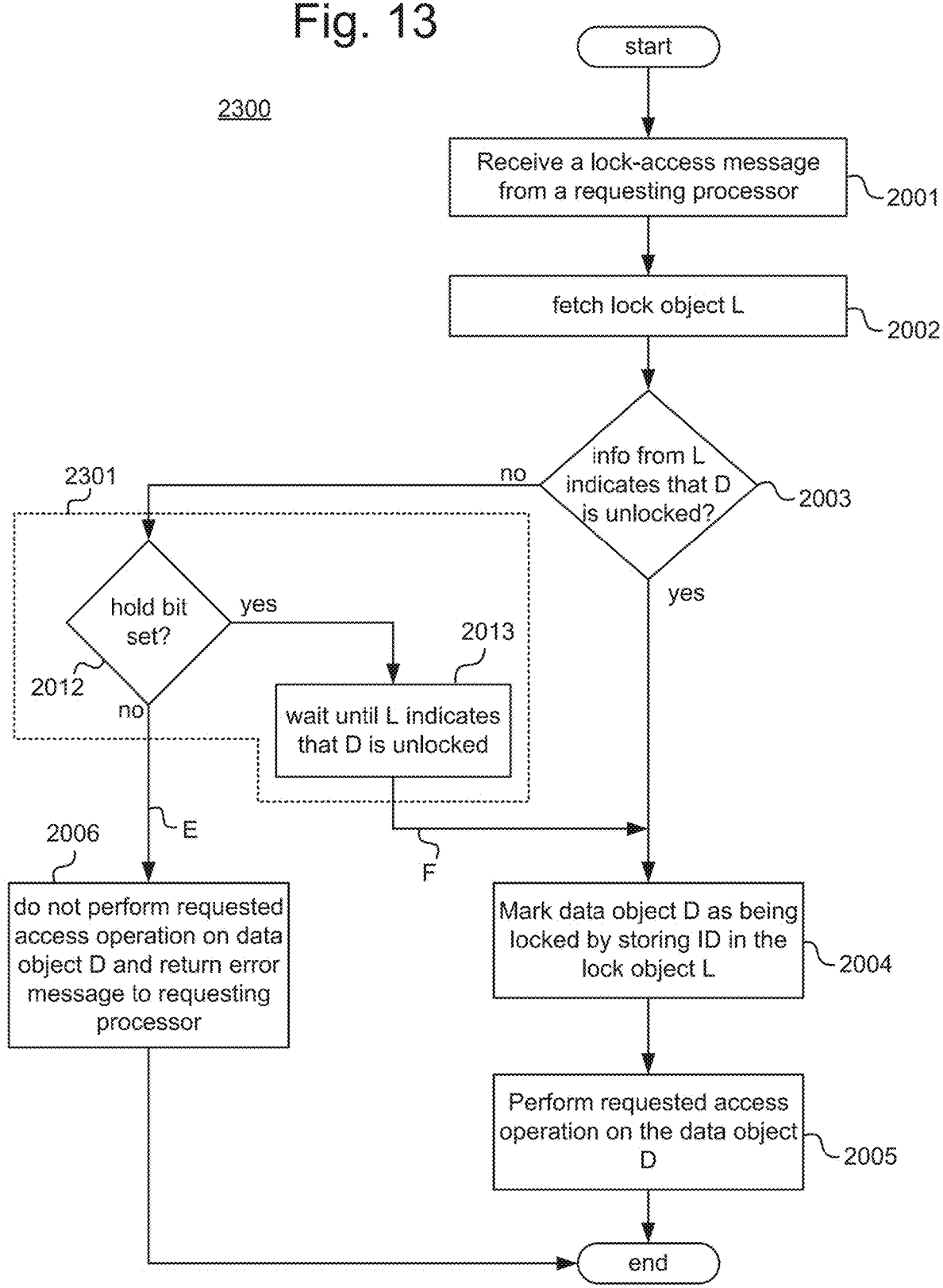
FIG. 13 is a process flow diagram illustrating another example process that may be performed in response to receiving a lock-access message.

FIG. 13 illustrates an example process 2300 that may be performed by the MSA 300 in response to receiving a lock-access message from a given node 100. In particular, logic circuits of the MSA 300 and/or machine readable instructions executed by a processor of the MSA 300 may be such that they cause the MSA 300 to perform the operations illustrated in FIG. 13.

The example process 2300 is a variation of the example process 2000. In particular, the example process 2300 comprises the example process 2000 with the addition of a sub-process 2301. Specifically, the example process 2300 includes blocks 2001-2006 that are similar to the blocks 2001-2006 of the example process 2000, and in addition to this the example process 2300 further includes blocks 2012-2013 (which form the sub-process 2301). Blocks 2001-2006 of the example process 2300 are not described in detail below to avoid duplicative description. The description of blocks 2001-2006 above in relation to the example process 2000 may be applicable to blocks 2001-2006 of the example process 2300, with some modifications described below.

The sub-process 2301 is located between block 2003 and block 2006 on the NO branch of the branching resulting from the decision in block 2003. The sub-process 2301 is executed after block 2003 if the result of block 2003 is NO. Blocks 2003 and/or 2006 are modified such that block 2006 is reached via path E of the sub-process 2201, rather than block 2006 being reached directly from block 2003.

Specifically, if the determination of block 2003 is answered NO (data[L] indicates that the target data object D is locked), then the process continues to block 2012. In block 2012, the MSA 300 determines whether a hold flag is set in the access-lock message. If the answer in block 2012 is YES (hold flag is set), then the process continues to block 2013. If the answer in block 2010 is NO (hold flag not set), then the process continues to block 2006 via the path E.

In block 2013, the MSA 300 waits until the target data object D is unlocked. For example, the MSA 300 may wait until it unlocks the target data object D by clearing the lock object L. Once the target data object D is unlocked, the process may proceed to block 2004 via path F.

Thus, the sub-process 2301 is added to the example process 2300 to provide an option for a lock and access requested by an access-lock message to be held until the target data object D is unlocked. This may reduce the number of messages on the memory fabric 200, as an error message to the requesting processor 115 and resend attempts from the requesting processor 115 may be avoided. However, this behavior could potentially allow a processor 115 to be permanently stalled waiting for data, and therefore in certain examples this feature is enabled in trusted environments that are free of deadlock.

In FIG. 13, the decisions reflected in blocks 2003 and 2012 are illustrated conceptually as being made in two nested yes-no decision blocks for ease of description. However, in certain examples the decisions reflected in decision blocks 2003 and 2012 could be made as part of a single non-binary decision block with three possible outcome paths. For example, it may be determined in a single operation whether: data[L] includes no identifier (if so, go to block 2004); data[L] includes an identifier and the hold bit is set (if so, go to block 2013); or data[L] includes an identifier and the hold bit is not set (if so, go to block 2006).

Example variations of the example process 2000 are described above in which the sub-processes 2101, 2201, and 2301 are added separately to the example process 2000. However, additional example variations of the example process 2000 are also within the contemplated scope of this disclosure, including examples in which any combination of the sub-processes 2101, 2201, and 2301 are added to the example process 2000 in any order of execution. When multiple of the sub-processes 2101, 2201, and 2301 are added to the example process 2000, the sub-processes may be nested such that the NO branch of the block 2003 is the input of the first sub-process, the output path A, C, or E of the first sub-process is the input of the second sub-process, and the output path A, C, or E of the second sub-process is the input of the third sub-process (if there is a third sub-process). For example, the sub-process 2101 may be followed by either of the sub-processes 2201 or 2301 such that the output path A of the sub-process 2101 is the input of the following sub-process 2201 or 2301. As another example, the sub-process 2201 may be followed by either of the sub-processes 2101 or 2301 such that the output path C of the sub-process 2201 is the input of the following sub-process 2101 or 2301. As another example, the sub-process 2301 may be followed by either of the sub-processes 2101 or 2201 such that the output path E of the sub-process 2301 is the input of the following sub-process 2101 or 2201.

Although not illustrated, in certain examples of the process 2000 (or any of the variations thereof), the decision block 2003 may also determine whether the target data address D is included within a lock region that is specified in bounds information included in data[L]. In such examples, the process continues along the YES branch (e.g., to block 2004) if the target data address D is included within the lock region and data[L] indicates that the target data address is unlocked. In such example, the process continues along the NO branch (e.g., to block 2006 or to one of the sub-processes 2101, 2201, or 2301) if either the target data address D is not included within the lock region or data[L] indicates that the target data address is locked.

Although not illustrated, in certain examples of the process 3000 (or any of the variations thereof), the decision block 3003 may also determine whether the target data address D is included within a lock region that is specified in bounds information included in data[L]. In such examples, the process continues to block 3004 if the target data address D is included within the lock region and data[L] indicates that the target data address is unlocked. In such example, the process continues to block 3006 if either the target data address D is not included within the lock region or data[L] indicates that the target data address is locked.

The process flow diagrams in FIGS. 3, 4, 7, 8, and 11-13 and the descriptions herein are presented to aid the understanding of the example processes, but are not intended to be exhaustive descriptions thereof. For example, the example processes could include additional operations besides those illustrated in the Figures and described herein. As another example, the example processes could omit certain operations illustrated in the Figures and described herein. Furthermore, the operations are illustrated in a particular order for ease of description, but in practice some operations may be performed concurrently and/or in a different order than that illustrated. In addition, certain operations that were described separately for ease of understanding may, in practice, be performed together as part of a single operation.

Figure 14:
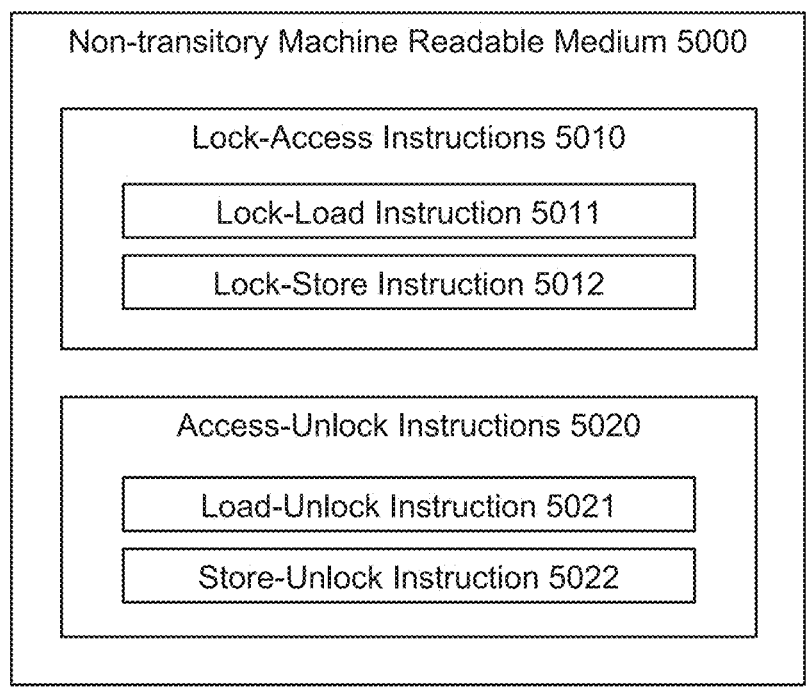
FIG. 14 is a block diagram illustrating an example non-transitory machine readable medium storing lock-access instructions and access-unlock instructions.

FIG. 14 illustrates an example non-transitory machine readable medium 5000 that stores lock-access instructions 5010 and/or access-unlock instructions 5020. The machine readable medium 5000 may include any non-transitory media that can store instructions and is readable by a machine, such as a memory device (e.g., the local memory 120, the persistent memory 400, USB drive, etc.), a hard disk drive, a solid-state drive, an optical disk (e.g., CD, DVD, Blu-ray, etc.), a magnetic disk, and the like.

The lock-access instructions 5010 may include any "lock-access instructions" as defined above. For example, the lock-access instructions 5010 may include instructions that are of such a nature that when they are invoked at a processor (such as the processor 115) of a rack-scale system (such as the rack-scale system 10), they cause the processor to perform the operations described above in relation to the example process 1000 and illustrated in FIG. 3. For example, the lock-access instructions 5010 may include a lock-load instruction 5011 and/or a lock-store instruction 5012.

The lock-access instructions 5010 may include a field (e.g., an opcode) that indicates the type of instruction it is (e.g., that it is a lock-access instruction and the type of access requested), as well as fields (e.g., operands) specifying the target data object (or a location (e.g., register) that stores information specifying the target data object) and possibly a data payload (or a location (e.g., register) that stores the data payload). In certain examples, the lock-access instructions 5010 may also include a field (e.g., an operand) specifying the lock object (or a location that stores information specifying the lock object), but in other examples the lock object is not specified in the lock-access instructions 5010 (e.g., the processor executing the lock-access instruction may be configured to automatically identify the lock object that locks the target data object based on the target data object). In certain examples, the lock-access instructions 5010 may also include a field for specifying a number to set for a recursion counter associated with the lock object (see FIG. 11 and the description thereof), a field for specifying whether the lock that is requested allows other processors to read from the target data address while it is locked (see FIG. 12 and the descriptions thereof), and/or a field (e.g., a hold bit) for specifying whether the MSA should wait to perform the requested lock and access until the data object is unlocked (see FIG. 13 and the description thereof). In certain examples, whether the lock that is requested allows other processors to read from the target data address while it is locked may be implicit in the type of instruction, and thus might not be specified by a separate field (e.g., there may be different opcodes locks for "read-only" locks and "exclusive" locks).

The access-unlock instructions 5020 may include any "access-unlock instructions" as defined above. For example, the access-unlock instructions 5020 may include instructions that are of such a nature that when they are invoked at a processor (such as the processor 115) of a rack-scale system (such as the rack-scale system 10), they cause the processor to perform the operations described above in relation to the example process 1010 and illustrated in FIG. 7. For example, the access-unlock instructions 5020 may include a load-unlock instruction 5021 and/or a store-unlock instruction 5022.

The access-unlock instructions 5020 may include a field (e.g., an opcode) that indicates the type of instruction it is (e.g., that it is an access-unlock instruction and the type of access requested), as well as fields (e.g., operands) specifying the target data object (or a location (e.g., register) that stores information specifying the target data object) and possibly a data payload (or a location (e.g., register) that stores the data payload). In certain examples, the access-unlock instructions 5020 may also include a field (e.g., an operand) specifying the lock object (or a location that stores information specifying the lock object), but in other examples the lock object is not specified in the access-unlock instructions 5020 (e.g., the processor executing the access-unlock instruction may be configured to automatically identify the lock object that locks the target data object based on the target data object).

As used herein, a "processor" may include any logic circuitry that is capable of executing machine readable instructions stored in a non-transitory machine-readable medium (such as the local memory 120, the persistent memory 400, an optical disk, a magnetic disk, etc). For example, a "processor" (such as the processor 115) may be, for example, a central processing unit (CPU), a microprocessor, a microcontroller, a digital signal processor (DSP), etc.

As used herein, a "coprocessor" is a processor that is configured to supplement the functions of a primary processor. In certain examples, a coprocessor may be controlled by coprocessor instructions that are part of a primary processor's instruction stream. In other examples, a coprocessor may be independent of and capable of working asynchronously with the primary processor.

As used herein, "global" means pertaining to all nodes 100 of the system 10. For example, the global persistent memory 400 is global in the sense that it is possible for all of the nodes 100 in the system 10 to be granted access to the persistent memory 400. This does not necessarily mean that all of the nodes 100 in the system are actually granted access to the persistent memory 400 at a given time, but rather that they could be granted such access (via the global policy engine 500). As another example, the global policy engine is global in the sense that it can set access policies for all of the nodes 100 in the system.

As used herein, "operating system" or "OS" refers broadly to system software that manages hardware and software resources, which may include a Unix-based OS, a Linux-based OS, a Microsoft Windows-based OS, and the like, as well as hypervisors and container engines.

As used herein, "persistent memory" refers to any memory device that stores information persistently relative to the nodes 100. Storing information persistently relative to the nodes 100 means the stored information has a lifetime independent of the nodes 100. This may include non-volatile memory and volatile memory.

As used herein, an "object" refers to a physical memory address or range of physical memory addresses (i.e., region) in the physical address space of the global persistent memory. A "data object" is an object that is to store data, meaning a physical memory address or range of physical memory addresses that are to store data. A "lock object" is an object that controls locking of a data object, meaning a physical memory address or range of physical memory addresses that control, via the information stored therein, locking of a data object.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of processors, wherein the processors . . . " could encompass both one processor and multiple processors, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one item is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

While the above disclosure has been shown and described with reference to the foregoing examples, it should be understood that other forms, details, and implementations may be made without departing from the spirit and scope of this disclosure.

What is claimed is:

1. A computing system comprising:
   a plurality of processors;
   persistent memory that is shared by the plurality of processors, and to which access is restricted; and
   a memory-side accelerator (MSA) that is to control access to the memory;
   wherein a requesting processor of the plurality of processors is to simultaneously request locking of and access to a target data object of the persistent memory by sending a single lock-and-access message to the MSA, and
   the lock-and-access message comprising at least two memory capabilities, each of which is an unforgeable pointer granting one or more types of access to the target data object by the requesting processor, and a specified access operation that is requested, a first memory capability of the at least two memory capabilities pointing to the target data object, a second memory capability of the at least two memory capabilities pointing to a lock object that controls locking of the target data object.

2. The computing system of claim 1,
   wherein the MSA is to, in response to receiving the lock-and-access message:
   fetch locking information that is stored in the lock object pointed to by the second memory capability, and
   determine, based on the locking information, whether to lock and perform the requested access operation on the target data object pointed to by the first memory capability for the requesting processor.

3. The computing system of claim 2,
   wherein the MSA is to, in response to receiving the lock-and-access message:
   if the locking information indicates an unlocked state, lock the target data object for the requesting processor by storing an identifier of the requesting processor in the lock object and perform the requested access operation on the target data object; and
   if the locking information includes an identifier of one of the plurality of processors other than the requesting processor, do not lock or perform the requested access operation on the target data object.

4. The computing system of claim 2,
   wherein the lock object includes bounds information specifying a lock range, and
   the MSA is to, in response to receiving the lock-and-access message, determine whether to lock and perform the requested access operation on the target data object based on whether the target data object is within the lock range specified in the bounds information.

5. The computing system of claim 2,
   wherein the MSA is to, in response to receiving the lock-and-access message, if the locking information includes an identifier of the requesting processor, determine whether to perform the requested access operation on the target data object based on a current value of a recursion counter that is associated with the lock object.

6. The computing system of claim 5,
   wherein the MSA is to, in response to receiving the lock-and-access message, if the locking information matches the identifier of the requesting processor and the current value of the recursion counter is non-zero, perform the requested access operation and decrement the recursion counter.

7. The computer system of claim 2,
   wherein the MSA is to, in response to receiving the lock-and-access message:
   if the locking information includes an identifier of one of the plurality of processors other than the requesting processor, wait to perform the requested access operation on the target data object until the lock object indicates an unlocked state.

8. The computing system of claim 2,
   wherein the MSA is to, in response to receiving the lock-and-access message:
   if the locking information includes an identifier of one of the plurality of processors other than the requesting processor:
   if the requested access operation is a load operation, determine whether to perform the load operation on the target data object based on a read counter in the lock object; and
   if the requested access is a write operation, do not perform the requested access on the target data object.

9. The computing system of claim 1,
   wherein the requesting processor is to simultaneously request access to and unlocking of the target data object of the persistent memory by sending a single access-and-unlock message to the MSA, and
   the access-and-unlock message includes a third memory capability pointing to the target data object, a fourth memory capability pointing to the lock object that controls locking of the target data object, and a specified access operation that is requested.

10. The computing system of claim 9,
    wherein the MSA is to, in response to receiving the access-and-unlock message:

fetch locking information that is stored in the lock object pointed to by the fourth memory capability ("second locking information"), and determine whether to perform the requested access operation on and unlock the target data object pointed to by the third memory capability based on whether the second locking information matches an identifier of the requesting processor.

11. An electronic device comprising:

persistent memory to which access is restricted; and a memory-side accelerator (MSA) that is to control access to the persistent memory by a plurality of processors that share the persistent memory, wherein the MSA is to, in response to receiving an instance of a lock-and-access message from a requesting processor of the plurality of processors, the lock-and-access message comprising at least two memory capabilities, each of which is an unforgeable pointer granting one or more types of access to the target data object by the requesting processor, and an access operation that is requested, a first memory capability of the at least two memory capabilities pointing to a target data object, a second memory capability of the at least two memory capabilities pointing to a lock object that controls locking of the target data object:

fetch locking information that is stored in the lock object pointed to by the second memory capability, and determine, based on the locking information, whether to lock and perform the requested access operation on the target data object pointed to by the first memory capability for the requesting processor.

12. The electronic device of claim 11, wherein the MSA is to, in response to receiving the lock-and-access message:

if the locking information indicates an unlocked state, lock the target data object for the requesting processor by storing an identifier of the requesting processor in the lock object and perform the requested access operation on the target data object; and if the locking information includes an identifier of one of the plurality of processors other than the requesting processor, do not lock or perform the requested operation on the target data object.

13. The electronic device of claim 11, wherein the lock object includes bounds information specifying a lock range, and the MSA is to, in response to receiving the lock-and-access message, determine whether to lock and perform the requested access operation on the target data object based on whether the target data object is within the lock range specified in the bounds information.

14. The electronic device of claim 11, wherein the MSA is to, in response to receiving the lock-and-access message, if the locking information includes an identifier of the requesting processor:

if a current value of a recursion counter associated with the lock object is non-zero, perform the requested access operation and decrement the recursion counter;

if a current value of the recursion counter is zero, do not perform the requested access operation.

15. The electronic device of claim 11, wherein the MSA is to, in response to receiving the lock-and access message:

if the locking information includes an identifier of one of the plurality of processors other than the requesting processor, wait to lock and perform the requested access operation on the target data object for the requesting processor until the lock object indicates an unlocked state.

16. The electronic device of claim 11, wherein the MSA is to, in response to receiving the lock-and-access message:

if the locking information includes an identifier of one of the plurality of processors other than the requesting processor:

if the requested access operation is a load operation, determine whether to perform the load operation on the target data object based on a read counter in the lock object; and if the requested access is a write organization, do not perform the requested access on the target data object.

17. The electronic device of claim 11, wherein the MSA is to, in response to receiving an instance of an access-and-unlock message from the requesting processor, the access-and-unlock message including a third memory capability pointing to the target data object, a fourth memory capability pointing to the lock object that controls locking of the target data object, and an access operation that is requested:

fetch locking information that is stored in the lock object pointed to by the fourth memory capability ("second locking information"), and determine whether to perform the requested access operation on and unlock the target data object pointed to by the third memory capability of the access-and-unlock message based on whether the second locking information matches an identifier of the requesting processor.

18. An electronic device comprising a processor that is to execute an instruction set that includes:

lock-and-access instructions that, when executed by a processor, cause the processor to simultaneously request locking of and access to a specified target data object of a persistent memory that is shared by multiple processors, and to which access is restricted, by sending a single lock-and-access message to a memory-side accelerator, wherein each instance of the lock-and-access message comprises at least two memory capabilities, each of which is an unforgeable pointer granting one or more types of access to the target data object by the requesting processor, and a specified access operation that is requested, a first memory capability of the at least two memory capabilities pointing to the specified target data object, a second memory capability of the at least two memory capabilities pointing to a lock object that controls locking of the target data object.

19. The electronic device of claim 18, wherein the lock-and-access instructions include a lock-and-load instruction, in which the access operation that is requested is a load operation, and a lock-and-store instruction, in which the access operation that is requested is a store operation.

20. The electronic device of claim 18, wherein the instruction set further includes:

access-and-unlock instruction that, when executed by the processor, cause the processor to simultaneously request access to and unlocking of a specified target data object by sending a single access-and-unlock message to the memory-side accelerator, wherein each instance of the access-and-unlock message includes a third memory capability pointing to the specified target data object, a fourth memory capability pointing to a lock object that controls locking of the target data object, and a specified access operation that is requested.

* * * * *